United States Patent
Yang

(10) Patent No.: US 8,072,161 B2
(45) Date of Patent: *Dec. 6, 2011

(54) BI-DIRECTIONAL LIGHT EMITTING DIODE DRIVE CIRCUIT IN PULSED POWER NON-RESONANCE

(76) Inventor: Tai-Her Yang, Dzan-Hwa (TW)

( * ) Notice: Subject to any disclaimer, the term of this patent is extended or adjusted under 35 U.S.C. 154(b) by 312 days.

This patent is subject to a terminal disclaimer.

(21) Appl. No.: 12/351,940

(22) Filed: Jan. 12, 2009

(65) Prior Publication Data
US 2009/0179580 A1 Jul. 16, 2009

Related U.S. Application Data

(60) Provisional application No. 61/020,819, filed on Jan. 14, 2008.

(51) Int. Cl.
*H05B 41/36* (2006.01)

(52) U.S. Cl. ......... 315/307; 315/291; 315/250; 315/224

(58) Field of Classification Search ............. 315/227 R, 315/228, 239, 244, 291, 276, 283, 246, 248, 315/258, 290, 297, 307
See application file for complete search history.

(56) References Cited

U.S. PATENT DOCUMENTS

| | | | |
|---|---|---|---|
| 2003/0122502 A1* | 7/2003 | Clauberg et al. | 315/291 |
| 2008/0054814 A1* | 3/2008 | Deppe et al. | 315/192 |
| 2010/0052566 A1* | 3/2010 | Kitamura et al. | 315/291 |
| 2010/0060182 A1* | 3/2010 | Stack | 315/228 |

* cited by examiner

*Primary Examiner* — Shawki S Ismail
*Assistant Examiner* — Jany Tran
(74) *Attorney, Agent, or Firm* — Rabin & Berdo, P.C.

(57) ABSTRACT

The present invention uses capacitive, inductive, or resistive impedance to constitute the first impedance, and the capacitive and inductive impedances in parallel connection which will not produce parallel resonance to constituted the second impedance, and is characterized in that the first and second impedance in series connection is configured for inputting pulsed power, thereby to form a bi-directional power in decaying wave shape at the two ends of the second impedance to drive the bi-directional conducting light emitting diode.

26 Claims, 9 Drawing Sheets

BI-DIRECTIONAL LIGHT EMITTING DIODE DRIVE CIRCUIT IN PULSED POWER NON-RESONANCE

BACKGROUND OF THE INVENTION (a) Field of the Present Invention

The present invention discloses to use a pulsed power as the power source, whereof the capacitive impedance component (or the inductive impedance component or the resistive impedance component) constitutes the first impedance, and the capacitive impedance and inductive impedance are in parallel connection whereof their parallel resonance frequency is different from the pulse period of the pulsed power, thereby to constitute the second impedance without parallel resonance, whereof the first impedance and the second impedance are in series connection, whereby the two ends of the two after series connection are arranged for inputting a pulsed power, and the voltage of pulsed power from the power source is divided by the series connected first and second impedance; According to the circuit aforementioned, the bi-directional divided alternated power in decaying wave shape is formed across the two ends of the second impedance, whereof it is characterized in that a bi-directional conducting light emitting diode is driven by the divided power, or at least two bi-directional conducting light emitting diode sets which are respectively parallel connected across the two ends of the first impedance and the second impedance are respectively driven by the divided powers across the two ends of the first impedance and the two ends of the second impedance.

(b) Description of the Prior Art

The conventional light emitting diode drive circuit using AC or DC power source is usually series connected with current limit resistors as the impedance to limit the current to the light emitting diode, whereof the voltage drop of the series connected resistive impedance always result in waste of power and accumulation of heat which are the imperfections.

SUMMARY OF THE PRESENT INVENTION

The present invention is disclosed by that a pulsed power is used as the power source, the capacitive impedance component (or inductive impedance component or resistive impedance component) constitute the first impedance, and the capacitive impedance and inductive impedance are in parallel connection whereof their parallel resonance frequency is different from the pulse period of the pulsed power, thereby to constitute the second impedance without parallel resonance, whereof it is characterized in that the two ends of the first impedance and second impedance in series connection are provided with a pulsed power output, whereof a bi-directional divided alternated power is formed across the two ends of the second impedance, whereby the divided power is used to drive the bi-directional conducting light emitting diode.

DESCRIPTION OF MAIN COMPONENT SYMBOLS

C100, C200: Capacitor
CR100, CR101, CR102, CR201, CR202: Diode

ESD101, ESD102: Charge/discharge device
I100, I103, I104, I200: Inductive impedance component
IT200: Separating type transformer
L100: Bi-directional conducting light emitting diode set
LED101: First light emitting diode
LED102: Second light emitting diode
R101: Discharge resistance
R100, R103, R104: Current limit resistor
ST200: Self-coupled transformer
U100: light emitting diode drive circuit
W0: Self-coupled voltage change winding
W1: Primary side winding
W2: Secondary side winding
Z101: First impedance
Z102: Second impedance
ZD101, ZD102: Zener diode
300: Bi-directional power modulator of series connection type
330: DC power modulator of series connection type
400: Bi-directional power modulator of parallel connection type
430: DC power modulator of parallel connection type
500: Impedance component
600: Switching device
5000: DC to DC Converter

DETAILED DESCRIPTION OF THE PREFERRED EMBODIMENTS

The circuit constitution and operating functions of the bi-directional light emitting diode drive circuit (U100) of the bi-directional light emitting diode drive circuit in pulsed power non-resonance is mainly by that at least one capacitive impedance component (or inductive impedance component, or resistive impedance component) constitutes the first impedance, and at least one capacitive impedance component and at least one inductive impedance component in parallel connection, whereof the inherent parallel resonance frequency of the two after parallel connection is different from the pulse period of the pulsed power, and no parallel resonance is produced, thereby to constitute the second impedance. Further, at least one first light emitting diode and at least one second light emitting diode are in parallel connection of inverse polarities, whereby to constitute a bi-directional conducting light emitting diode set which is parallel connected across the two ends of at least one second impedance, while the two ends of at least one first impedance and at least one second impedance are provided with a pulsed power input;

Through the above circuit, the bi-directional divided alternated power is formed across the two ends of the first impedance and across the two ends of the second impedance, whereof at least one bi-directional conducting light emitting diode set is driven by the bi-directional divided power in decaying wave shape formed at the second impedance, or at least two bi-directional conducting light emitting diode sets respectively parallel connected across the two ends of the first impedance and across the two ends of second impedance are respectively driven by the divided power across the two ends of the first impedance and across the two ends of the second impedance, thereby to constitute the bi-directional light emitting diode drive circuit in pulsed power non-resonance of the present invention.

Figure 1:
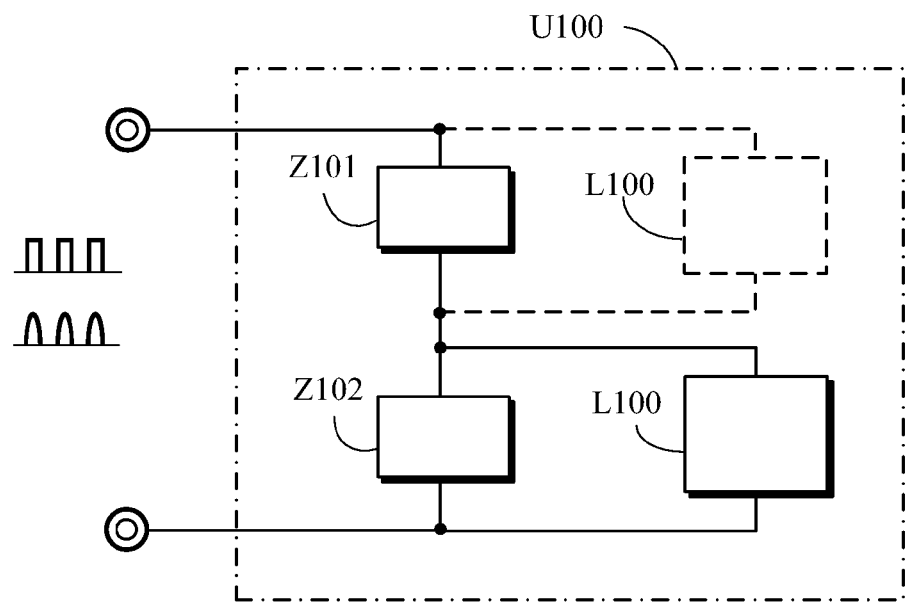
FIG. 1 is the schematic block diagram of the bi-directional light emitting diode drive circuit in pulsed power non-resonance.

FIG. 1 is a circuit example schematic block diagram of the bi-directional light emitting diode drive circuit in pulsed power non-resonance, whereof as shown in FIG. 1, the circuit operating function of the bi-directional light emitting diode drive circuit (U100) is constituted by the following:

A first impedance Z01: It is constituted by one or more than one kind and one or more than one capacitors (C100) (or inductive impedance component, or resistive impedance component); or constituted by two or more than two kinds of impedance components, whereof each kind of impedance component can be one or more than one in series connection, or parallel connection, or series and parallel connection;

A second impedance (Z102): It is constituted by at least one inductive impedance component (I200) and at least one capacitor (C200) in parallel connection, whereof their inherent parallel resonance frequency is different from the pulse period of the pulsed power, thereby no parallel resonance is produced;

The said bi-directional light emitting diode drive circuit in pulsed power non-resonance can be optionally installed with capacitive, inductive or resistive impedance components as needed, whereof the first impedance (Z101) is constituted by at least one of said three types of impedance components;

The first impedance (Z101) can also be selected not to be installed, while the second impedance (Z102) is directly parallel connected with the pulsed power source to operate in the non-parallel resonance status but appear bi-directional divided alternated power in decaying wave shape, whereof it is described in the following:

At least one first impedance (Z101) and at least one second impedance (Z102) are mutually series connected, whereof the two ends of the series connected first impedance (Z101) and second impedance (Z102) are for inputting:

(1) DC pulsed power; or
(2) The DC pulsed power with constant or variable voltage and constant or variable periods converted from DC power source; or
(3) The DC pulsed power with constant or variable voltage and constant or variable periods converted from DC power which is further rectified from AC power; or
(4) The half-wave or full-wave DC pulsed power rectified from AC power with constant or variable voltage and constant or variable frequency;

A bi-directional conducting light emitting diode set (L100): it is constituted by at least one first light emitting diode (LED101) and at least one second light emitting diode (LED102) in parallel connection of inverse polarities, whereof the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed, whereof it is parallel connected across the two ends of both or either of the first impedance (Z101) or the second impedance (Z102) to form divided power at two ends of both the first impedance (Z101) and the second impedance (Z102) by the power input, thereby to drive the bi-directional conducting light emitting diode set (L100) to emit light which is parallel connected across the two ends of the first impedance (Z101) and the second impedance (Z102).

The first impedance (Z101) and the second impedance (Z102) as well as the bi-directional conducting light emitting diode set (L100) in the bi-directional light emitting diode drive circuit (U100) can be optionally selected as needed to be one or more than one.

The bi-directional divided alternated power are formed across the two ends of the first impedance and the second impedance in the above circuit, whereof at least one bi-directional conducting light emitting diode set is driven by the divided power in decaying wave shape formed at the second impedance, or at least two bi-directional conducting light emitting diode sets which are respectively parallel connected across the two ends of the first impedance and the second impedance are respectively driven by the divided powers across the two ends of the first impedance and the second impedance, thereby to constitute the bi-directional light emitting diode drive circuit in pulsed power non-resonance.

Figure 2:
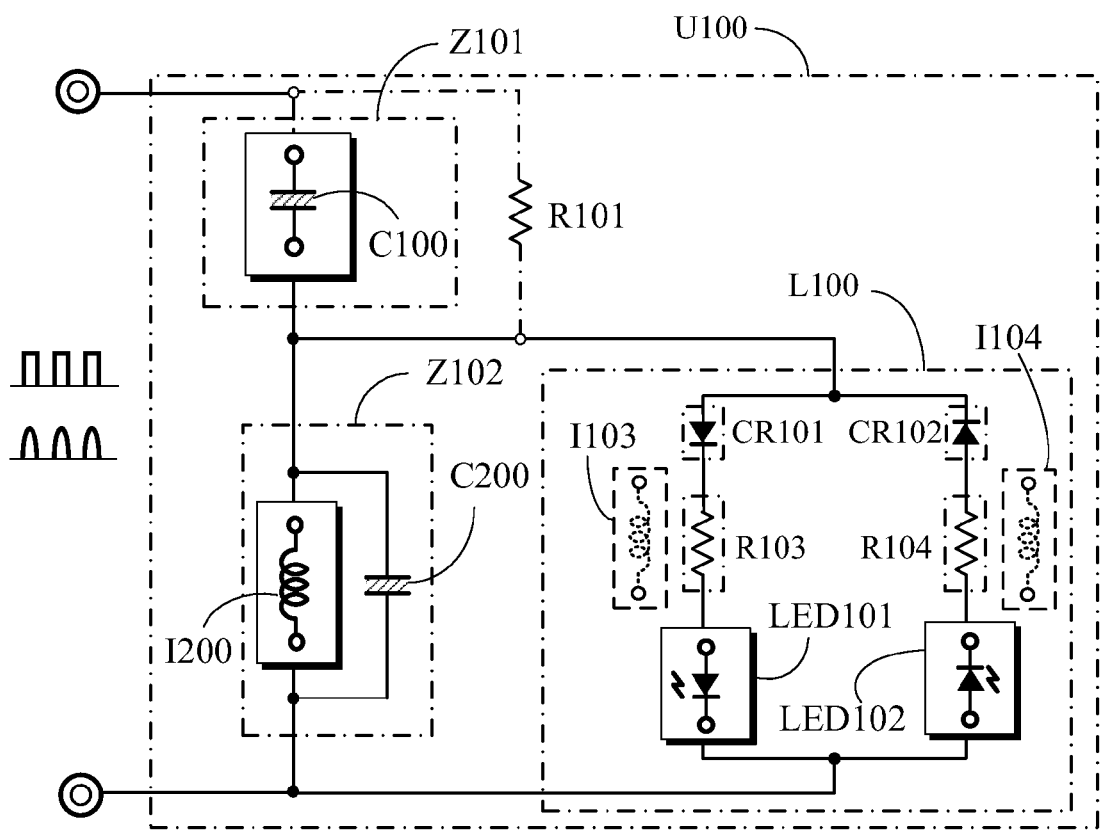
FIG. 2 is the circuit example schematic diagram of the present invention.
Figure 3:
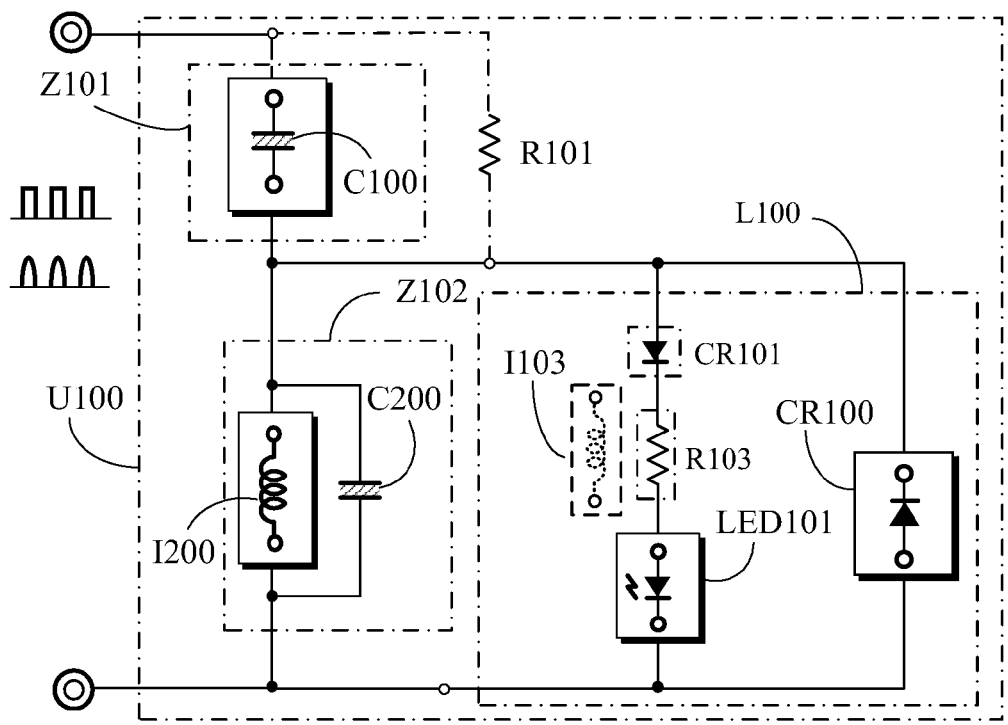
FIG. 3 is a circuit example schematic diagram of the present invention illustrating that the bi-directional conducting light emitting diode set is constituted by a first light emitting diode and a diode in parallel connection of inverse polarities.
Figure 4:
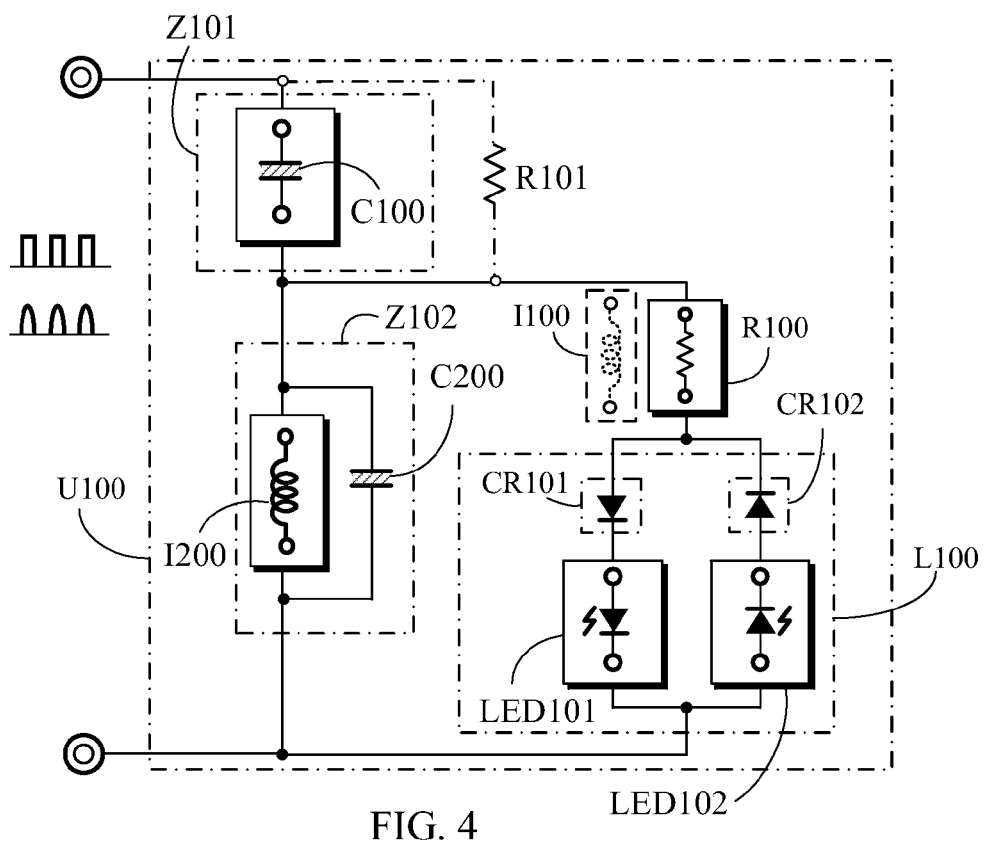
FIG. 4 is a circuit example schematic diagram illustrating that the bi-directional conducting light emitting diode set is series connected with a current limit resistor.
Figure 5:
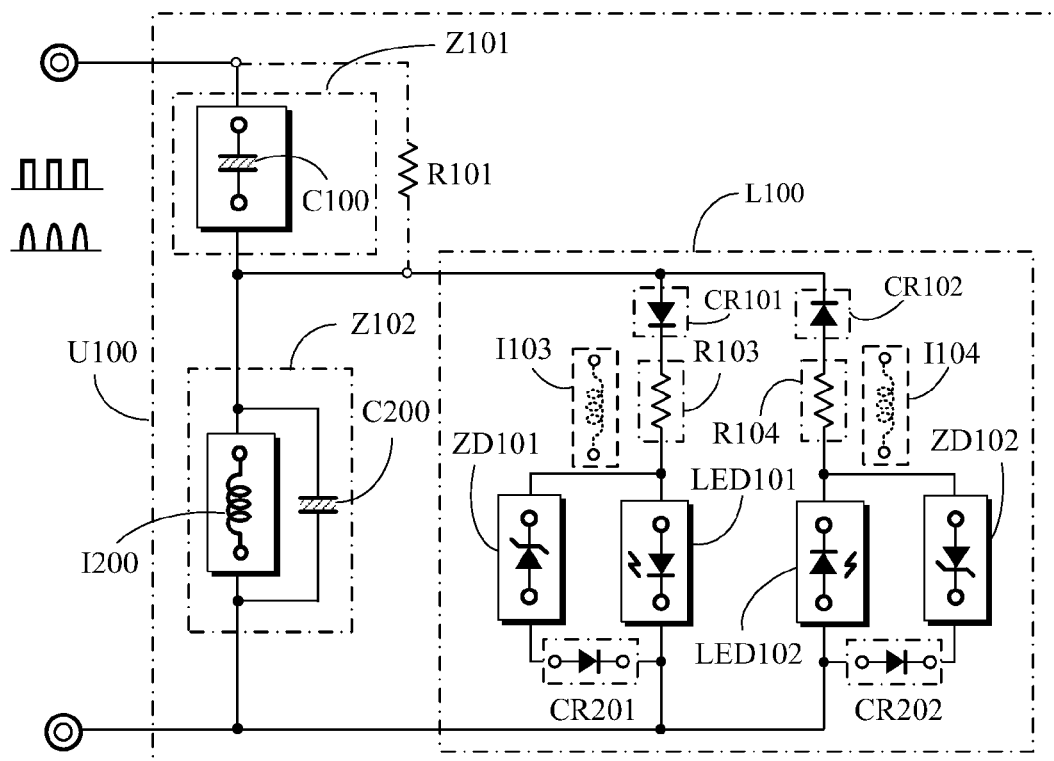
FIG. 5 is a circuit example schematic diagram illustrating that the bi-directional conducting light emitting diode set is further installed with a zener diode in the circuit of FIG. 2.

For convenience of description, the components listed in the circuit examples of the following exemplary embodiments are selected as in the following:

(1) A first impedance (Z101) and a second impedance (Z102) as well as a bi-directional conducting light emitting diode set (L100) are installed in the embodied examples. Nonetheless, the selected quantities are not limited in actual applications;

(2) The capacitive impedance of the capacitor is selected to represent the impedance components, thereby to constitute the first impedance (Z101) and the second impedance (Z102), whereof the capacitive, inductive and/or resistive impedance components can be optionally selected as needed in actual applications, whereby it is described in the following:

FIG. 2 is a circuit example schematic diagram of the present invention which is comprised of:

A first impedance (Z101): it is constituted by at least one capacitor (C100) with especially referring to a bipolar capacitor, whereof the quantity of the first impedance can be one or more than ones, or the first impedance (Z101) can be optionally selected not to use as needed;

A second impedance (Z102): Its constituted by at least one inductive impedance component (I200) and at least one capacitor (C200) in parallel connection, whereof its inherent parallel resonance frequency after parallel connection is different from the pulse period of the pulsed power, thereby no parallel resonance is produced, whereof the quantity of the second impedance can be one or more than ones;

At least one first impedance (Z101) and at least one second impedance (Z102) are in series connection, whereof the two ends after series connection are provided with a pulsed power, thereby a bi-directional divided alternated power is formed at the second impedance (Z102) to drive at least one bi-directional conducting light emitting diode set (L100);

A bi-directional conducting light emitting diode set (L100): it is constituted by at least one first light emitting diode (LED101) and at least one second light emitting diode (LED102) in parallel connection of inverse polarities, whereof the numbers of the first light emitting diode (LED101) and the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed, whereof it is parallel connected across the two ends of both or either of the first impedance (Z101) or the second impedance (Z102) to form divided power, thereby to drive the bi-directional conducting light emitting diode set (L100) which is parallel connected across the two ends of the first impedance (Z101) or the second impedance (Z102) to emit light; or At least one bi-directional conducting light emitting diode set (L100) is parallel connected to the two ends of at least one second impedance (Z102), thereby to be driven by the divided power across the two ends of the second impedance (Z102) while the first impedance (Z101) is used to limit its current, whereof in case that the capacitor (C100) (such as a bipolar capacitor) is used as the first impedance component, the output current is limited by the capacitive impedance of the capacitor (C100);

The first impedance (Z101), the second impedance (Z102) and the bi-directional conducting light emitting diode set (L100) are connected according to the aforesaid circuit structure to constitute the bi-directional light emitting diode drive circuit (U100), and through the current distribution effect formed by the parallel connection of the bi-directional conducting light emitting diode set (L100) and the second impedance (Z102), the voltage variation rate across the two ends of the bi-directional conducting light emitting diode set (L100) corresponding to power source voltage variation can be reduced;

Selection of the first light emitting diode (LED101) and the second light emitting diode (LED102) which constitute the bi-directional conducting light emitting diode set (L100) in the bi-directional light emitting diode drive circuit (U100) includes the following:

1. A first light emitting diode (LED101) which can be constituted by one light emitting diode, or by more than one light emitting diodes in series connection of forward polarities, in parallel connection of the same polarity or in series and parallel connection;

2. A second light emitting diode (LED102) which can be constituted by one light emitting diode, or by more than one light emitting diodes in series connection of forward polarities, in parallel connection of the same polarities or in series and parallel connection;

3. The numbers of light emitting diodes which constitute the first light emitting diode (LED101) and the numbers of light emitting diodes which constitute the second light emitting diode (LED102) can be the same or different;

4. If the number of light emitting diodes which constitute either the first light emitting diode (LED101) or the second light emitting diode (LED102) respectively is one or more than one, the connecting relationship of the respective light emitting diodes can be in the same or different series connection, parallel connection or series and parallel connection;

5. One of the first light emitting diode (LED101) or the second light emitting diode (LED102) can be replaced by a diode (CR100) while the current direction of the diode (CR100) and the working current direction of the reserved first light emitting diode (LED101) or the second light emitting diode (LED102) are in parallel connection of inverse polarities, such as that FIG. 3 is a circuit example schematic diagram of the present invention illustrating that the bi-directional conducting light emitting diode set is constituted by a first light emitting diode and a diode in parallel connection of inverse polarities;

The bi-directional light emitting diode drive circuit in pulsed power non-resonance is operated through the circuit function of the bi-directional light emitting diode drive circuit (U100), whereof in actual applications, as shown in FIGS. 1, 2 and 3, the following auxiliary circuit components can be optionally selected as needed to be installed or not installed while the quantity of the installation can be constituted by one or more than one, whereof in case more than one are selected, they can be selected based on circuit function requirements to be in series connection or parallel connection or series and parallel connection in corresponding polarities, whereof the optionally selected auxiliary circuit components include:

A diode (CR101): It is optionally installed to series connected with the first light emitting diode (LED101), whereby to prevent reverse over-voltage;

A diode (CR102): It is optionally installed to series connected with the second light emitting diode (LED102), whereby to prevent reverse over-voltage;

A discharge resistor (R101): it is an optionally installed component, in case the capacitor (C100) (such as a bipolar capacitor) is selected for the first impedance (Z101), it is parallel connected across the two ends of the capacitor (C100) in the first impedance (Z101) to release the residual current of capacitor (C100);

A current limit resistor (R103): It is an optionally installed component which is series connected with the first light emitting diode (LED101) of the bi-directional conducting light emitting diode set (L100) individually, whereby to limit the current passing through the first light emitting diode (LED101), whereof the current limit resistor (R103) can also be replaced by an inductive impedance (I103);

A current limit resistor (R104): It is an optionally installed component which is series connected with the second light emitting diode (LED102) of the bi-directional conducting light emitting diode set (L100) individually, whereby to limit the current passing through the second light emitting diode (LED102), whereof the current limit resistor (R104) can also be replaced by an inductive impedance (I104);

The bi-directional light emitting diode drive circuit (U100), of which if the first light emitting diode (LED101) and the second light emitting diode (LED102) are both disposed with the current limit resistors (R103) and (R104), a current limit resistor (R100) can be directly series connected to the bi-directional conducting light emitting diode set (L100) to replace or installed together with the current limit resistors (R103) and (R104) to obtain current limit function, whereof the current limit resistor (R100) can be replaced by an inductive impedance component (I100); whereby the bi-directional light emitting diode drive circuit (U100) is constituted by the said circuit structure and selection of auxiliary circuit components as shown in FIG. 4 which is a circuit example schematic diagram illustrating that the bi-directional conducting light emitting diode set (L100) is series connected with a current limit resistor (R100);

In addition, to protect the light emitting diode and to avoid the light emitting diode (LED101) and (LED102) being damaged or reduced working life by abnormal voltage, a zener diode can be respectively parallel connected across the two ends of the first light emitting diode (LED101) and the second light emitting diode (LED102) of the bi-directional conducting light emitting diode set (L100), or the zener diode can be first series connected with at least one diode to produce the function of zener voltage effect, then to be parallel connected across the two ends of the first light emitting diode (LED101) or the second light emitting diode (LED102);

FIG. 5 is a circuit example schematic diagram illustrating that the bi-directional conducting light emitting diode set is further installed with a zener diode in the circuit of FIG. 2.

Figure 6:
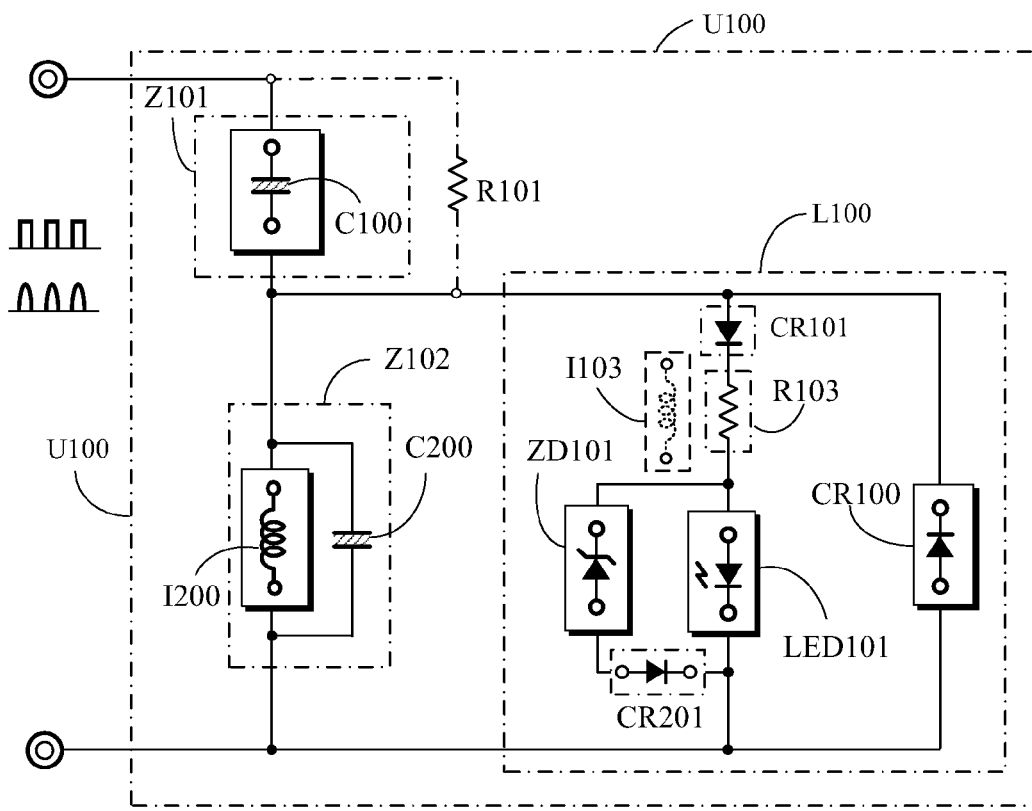
FIG. 6 is a circuit example schematic diagram illustrating that the bi-directional conducting light emitting diode set is further installed with a zener diode in the circuit of FIG. 3.

FIG. 6 is a circuit example schematic diagram illustrating that the bi-directional conducting light emitting diode set is further installed with a zener diode in the circuit of FIG. 3.

Figure 7:
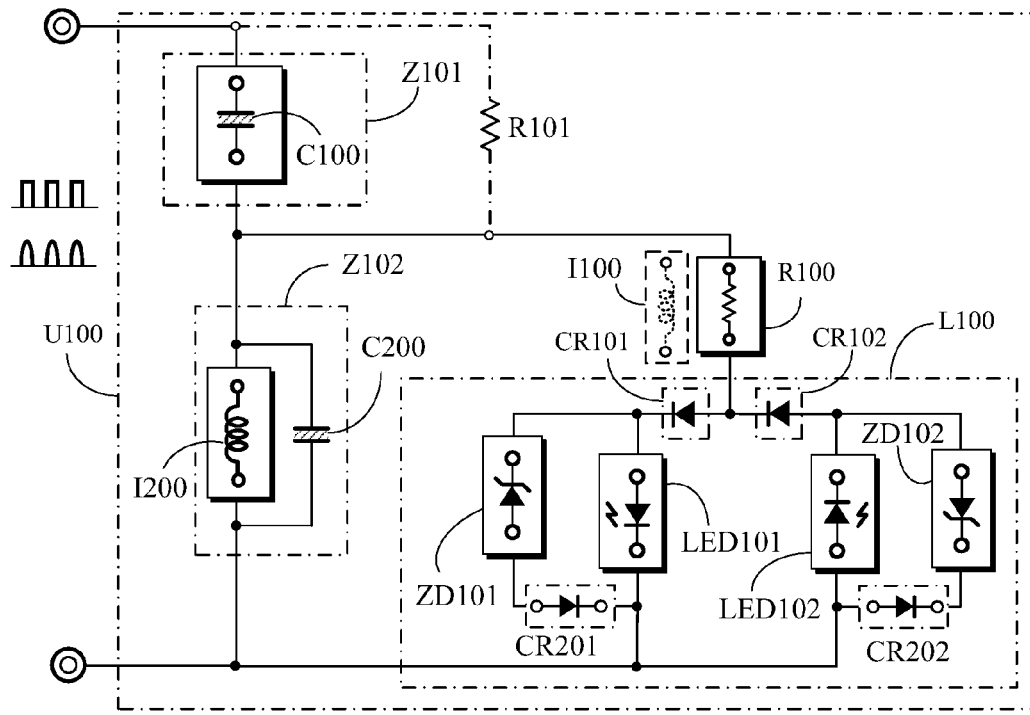
FIG. 7 is a circuit example schematic diagram illustrating that the bi-directional conducting light emitting diode set is further installed with a zener diode in the circuit of FIG. 4.

FIG. 7 is a circuit example schematic diagram illustrating that the bi-directional conducting light emitting diode set is further installed with a zener diode in the circuit of FIG. 4, whereof as shown in FIG. 7, it is comprised of that:

1. The two ends of the first light emitting diode (LED101) which constitutes the bi-directional conducting light emitting diode set (L100) in the bi-directional light emitting diode drive circuit (U100) are parallel connected with a zener diode (ZD101), whereof the polarity relationship is that the zener voltage of the zener diode (ZD101) is used to limit the working voltage across the two ends of the first light emitting diode (LED101);

The aforesaid zener diode (ZD101) can be optionally series connected with a diode (CR201) as needed to commonly produce a zener voltage effect function, whereby the advantages are 1) the zener diode (ZD101) can be protected from reverse current; 2) both diode (CR201) and zener diode (ZD101) have temperature compensation effect.

2. If the second light emitting diode (LED102) is selected in the bi-directional conducting light emitting diode set (L100), a zener diode can be optionally series connected with the two ends of the said second light emitting diode (LED102), whereof their polarity relationship is that the zener voltage of the zener diode (ZD102) is used to limit the working voltage across the two ends of the second light emitting diode (LED102);

The said zener diode (ZD102) can be optionally series connected with a diode (CR202) as needed, whereby the advantages are 1) the zener diode (ZD102) can be protected from reverse current; 2) both diode (CR202) and zener diode (ZD102) have temperature compensation effect.

The zener diode is constituted by:

(1) A zener diode (ZD101) is parallel connected across the two ends of the first light emitting diode (LED101) of the bi-directional conducting light emitting diode set (L100), and a zener diode (ZD102) is parallel connected across the two ends of the second light emitting diode (LED102); or (2) The two zener diodes (ZD101) and (ZD102) are series connected in opposite directions and further parallel connected across the two ends of the bi-directional conducting light emitting diode set (L100); or (3) It is replaced by the diode of bi-directional zener effect which is parallel connected across the two ends of the bi-directional conducting light emitting diode set (L100); all of the aforesaid three circuits can avoid over high end voltage to the first light emitting diode (LED101) and the second light emitting diode (LED 102).

Figure 8:
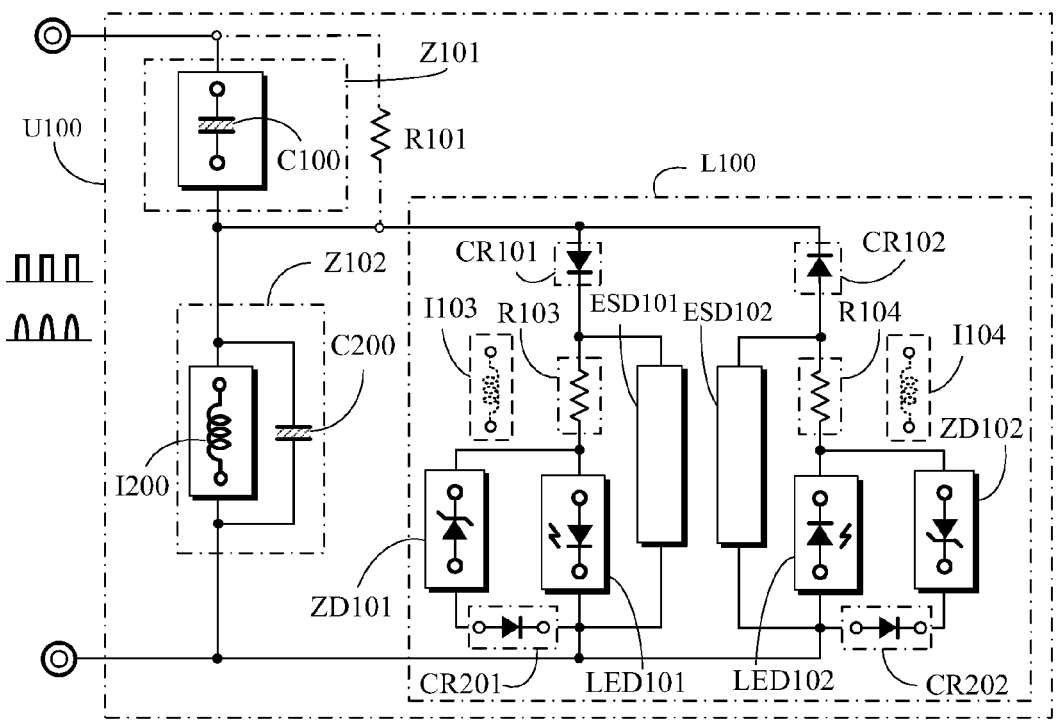
FIG. 8 is a circuit example schematic diagram illustrating that a charge/discharge device is parallel connected across the two ends of the light emitting diode and current limit resistor in series connection in the circuit of FIG. 5.
Figure 9:
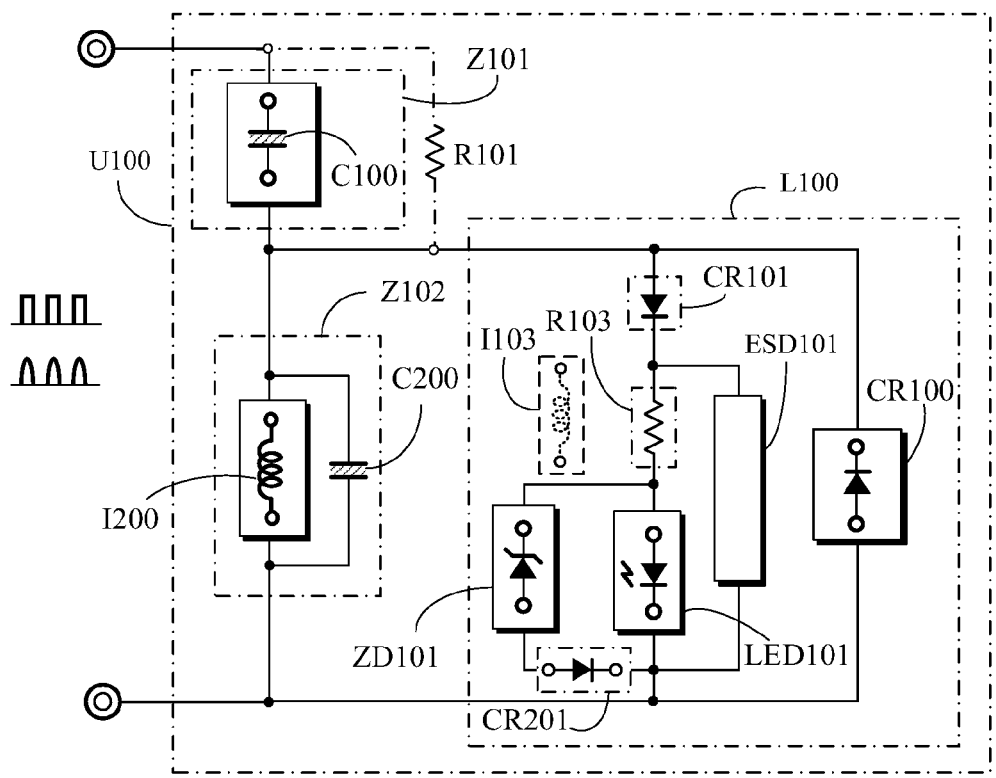
FIG. 9 is a circuit example schematic diagram illustrating that a charge/discharge device is parallel connected across the two ends of the light emitting diode and the current limit resistor in series connection in the circuit of FIG. 6.
Figure 10:
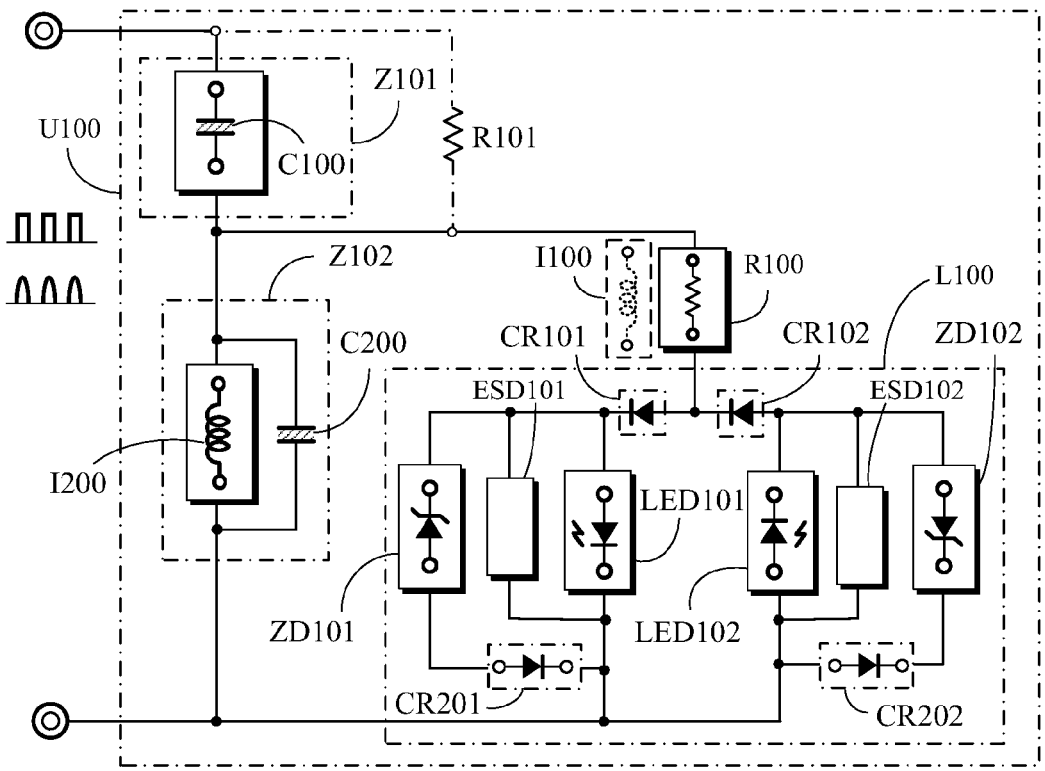
FIG. 10 is a circuit example schematic diagram illustrating that a charge/discharge device is parallel connected across the two ends of the light emitting diode and the current limit resistor in series connection in the circuit of FIG. 7.

The bi-directional driving light emitting diode circuit (U100) of the bi-directional driving light emitting diode drive circuit in pulsed power non-resonance as shown in the circuit examples of FIGS. 8, 9 and 10, whereof to promote the lighting stability of the light source produced by the light emitting diode, the first light emitting diode (LED101) can be installed with a charge/discharge device (ESD101), or the second light emitting diode (LED102) can be installed with a charge/discharge device (ESD102), whereof the charge/discharge device (ESD101) and the charge/discharge device (ESD102) have the random charging or discharging characteristics which can stabilize the lighting stability of the first light emitting diode (LED101) and the second light emitting diode (LED102), whereby to reduce their lighting pulsations the aforesaid charge/discharge devices (ESD101), (ESD102) can be constituted by the conventional charging and discharging batteries, or super-capacitors or capacitors, etc;

The bi-directional light emitting diode drive circuit in pulsed power non-resonance of the present invention can be further optionally installed with charge/discharge device as needed, whereof it includes:

1. The bi-directional light emitting diode drive circuit in pulsed power non-resonance, whereof in its bi-directional light emitting diode drive circuit (U100), a charge/discharge device (ESD101) can be parallel connected across the two ends of the current limit resistor (R103) and the first light emitting diode (LED101) in series connection;

Or a charge/discharge device (ESD102) can be further parallel connected across the two ends of the current limit resistor (R104) and the second light emitting diode (LED 102) in series connection;

FIG. 8 is a circuit example schematic diagram illustrating that a charge/discharge device is parallel connected across the two ends of the light emitting diode and current limit resistor in series connection in the circuit of FIG. 5, whereof it is comprised of:

A charge/discharge device (ESD101) based on its polarity is parallel connected across the two ends of the first light emitting diode (LED101) and the current limit resistor (R103) in series connection, or is directly parallel connected across the two ends of the first light emitting diode (LED101), whereof the charge/discharge device (ESD101) has the random charge/discharge characteristics to stabilize the lighting operation and to reduce the lighting pulsation of the first light emitting diode (LED101);

If the second light emitting diode (LED102) is selected to use, a charge/discharge device (ESD102) based on its polarity is parallel connected across the two ends of the second light emitting diode (LED102) and the current limit resistor (R104) in series connection, or is directly parallel connected across the two ends of the second light emitting diode (LED102), whereof the charge/discharge device (ESD102) has the random charge/discharge characteristics to stabilize the lighting operation and to reduce the lighting pulsation of the second light emitting diode (LED102);

The aforesaid charge/discharge devices (ESD101), (ESD102) can be constituted by the conventional charging and discharging batteries, or super-capacitors or capacitors, etc;

2. The bi-directional light emitting diode drive circuit in pulsed power non-resonance, whereof if a first light emitting diode (LED101) is selected and is reversely parallel connected with a diode (CR100) in the bi-directional light emitting diode drive circuit (U100), then its main circuit structure is as shown in FIG. 9 which is a circuit example schematic diagram illustrating that a charge/discharge device is parallel connected across the two ends of the light emitting diode and the current limit resistor in series connection in the circuit of FIG. 6, whereof a charge/discharge device (ESD101) based on its polarity is parallel connected across the two ends of the first light emitting diode (LED101) and the current limit resistor (R103) in series connection, whereof the charge/discharge device (ESD101) has the random charge/discharge characteristics to stabilize the lighting operation and to reduce the lighting pulsation of the first light emitting diode (LED101);

The aforesaid charge/discharge devices (ESD101), (ESD102) can be constituted by the conventional charging and discharging batteries, or super-capacitors or capacitors, etc;

3. In the bi-directional light emitting diode drive circuit (U100) of the bi-directional light emitting diode drive circuit in pulsed power non-resonance, when the current limit resistor (R100) is selected to replace the current limit resistors (R103), (R104) for the common current limit resistor of the bi-directional conducting light emitting diode set (L100), or the current limit resistors (R103), (R104) and (R100) are not installed, the main circuit structure is as shown in FIG. 10 which is a circuit example schematic diagram illustrating that a charge/discharge device is parallel connected across the two ends of the light emitting diode and the current limit resistor in series connection in the circuit of FIG. 7, whereof it is comprised of that:

A charge/discharge device (ESD101) is directly parallel connected across the two ends of the first light emitting diode (LED101) at the same polarity, and a charge/discharge device (ESD102) is directly parallel connected across the two ends of the second light emitting diode (LED 102) at the same polarity, whereof the charge/discharge devices (ESD101) and (ESD102) has the random charge or discharge characteristics;

The aforesaid charge/discharge devices (ESD101), (ESD102) can be constituted by the conventional charging and discharging batteries, or super-capacitors or capacitors, etc;

4. If the charge/discharge devices (ESD101) or (ESD102) used is uni-polar in the above said items 1, 2, 3, whereof after the first light emitting diode (LED101) is parallel connected with the uni-polar charge/discharge device (ESD101), a diode (CR101) of forward polarity can be optionally installed as needed to prevent reverse voltage from damaging the uni-polar charge/discharge device; whereof after the second light emitting diode (LED102) is parallel connected with the uni-polar charge/discharge device (ESD102), a diode (CR102) of forward polarity can be optionally installed as needed to prevent reverse voltage from damaging the uni-polar charge/discharge device;

5. The bi-polar charge/discharge device can be optionally parallel connected across the two ends of the bi-directional conducting light emitting diode set (L100) as needed.

Figure 11:
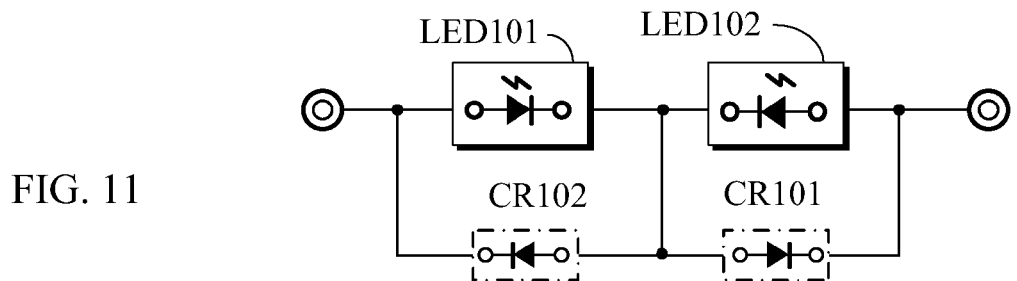
FIG. 11 is a circuit example schematic diagram of the bi-directional conducting light emitting diode set of the present invention illustrating that the first light emitting diode is reversely parallel connected with a diode, and the second light emitting diode is reversely parallel connected with a diode, whereby the two appear in series connection of opposite directions.

In addition, a charge/discharge device can be further installed across the two ends of the bi-directional conducting light emitting diode set (L100) in the bi-directional light emitting diode drive circuit (U100) for random charging/discharging, thereby besides of stabilizing the lighting stabilities of the first light emitting diode (LED101) and the second light emitting diode (LED102) of the bi-directional conducting light emitting diode set (L100), the charge/discharge device can provide its saved power during a power off to drive at least one of the first light emitting diode (LED101) or the second light emitting diode (LED102) to continue emitting light;

The aforesaid charge/discharge devices (ESD101), (ESD102) can be constituted by the conventional charging and discharging batteries, or super-capacitors or capacitors, etc;

The bi-directional conducting light emitting function of the diode in the said bi-directional conducting light emitting diode set (L100) is constituted by that:

(1) It is constituted by at least one first light emitting diode (LED101) and at least one second light emitting diode (LED102) in parallel connection of inverse polarities;

(2) At least one first light emitting diode (LED101) is series connected with a diode (CR101) in forward polarity, and at least one second light emitting diode (LED102) is series connected with a diode (CR102) in forward polarity, thereby the two are further parallel connected in inverse polarities;

(3) A diode (CR101) is parallel connected with at least one first light emitting diode (LED101) in inverse polarities, and a diode (CR102) is parallel connected with at least one second light emitting diode (LED102) in inverse polarities, whereof the two are further series connected in opposite directions to constitute a bi-directional conducting light emitting diode set, whereof it is as shown in FIG. 11 which is a circuit example schematic diagram of the bi-directional conducting light emitting diode set of the present invention illustrating that the first light emitting diode is reversely parallel connected with a diode, and the second light emitting diode is reversely parallel connected with a diode, whereby the two appear in series connection of opposite directions;

(4) Or it can be constituted by conventional circuit combinations or components which allow the light emitting diode to receive power and to emit light bi-directionally.

Figure 12:
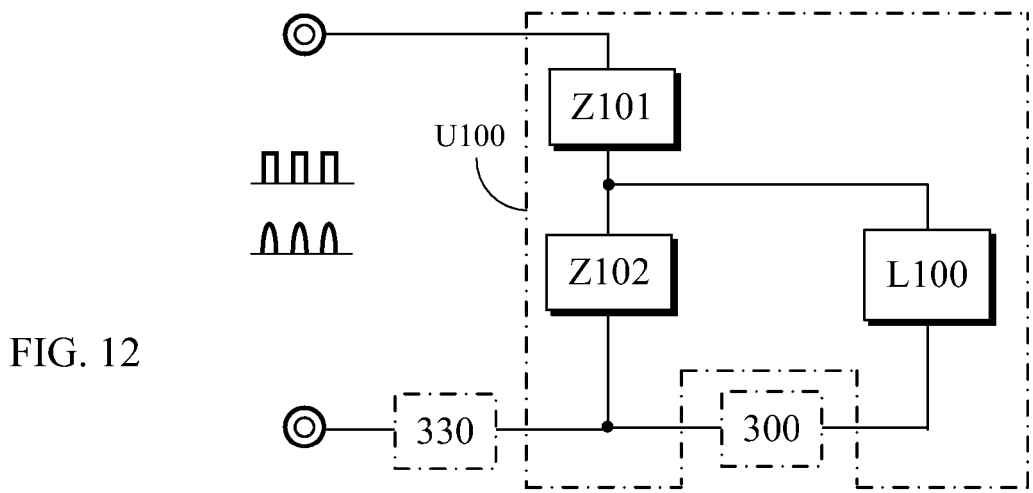
FIG. 12 is a circuit example schematic block diagram of the present invention which is series connected to the power modulator of series connection type.
Figure 13:
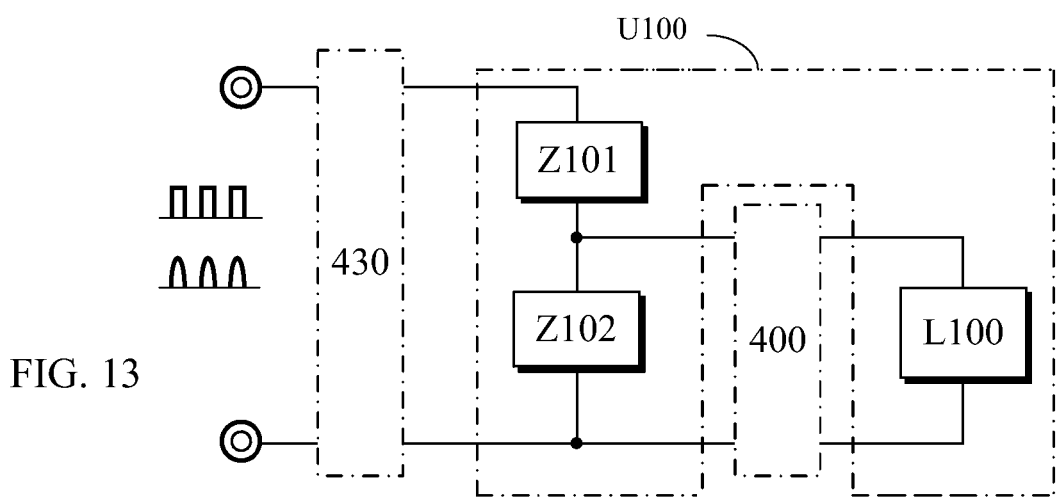
FIG. 13 is a circuit example schematic block diagram of the present invention which is parallel connected to the power modulator of parallel connection type.
Figure 14:
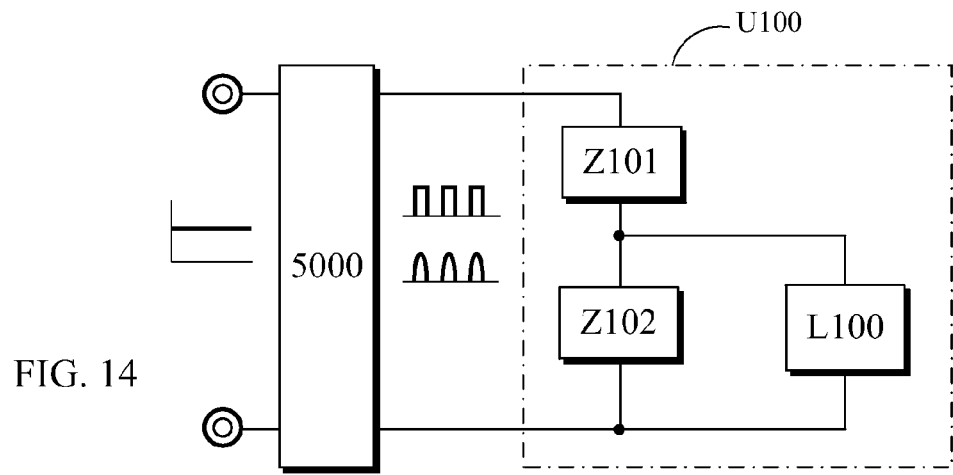
FIG. 14 is a circuit example schematic block diagram of the present invention driven by the DC to DC converter output power.
Figure 15:
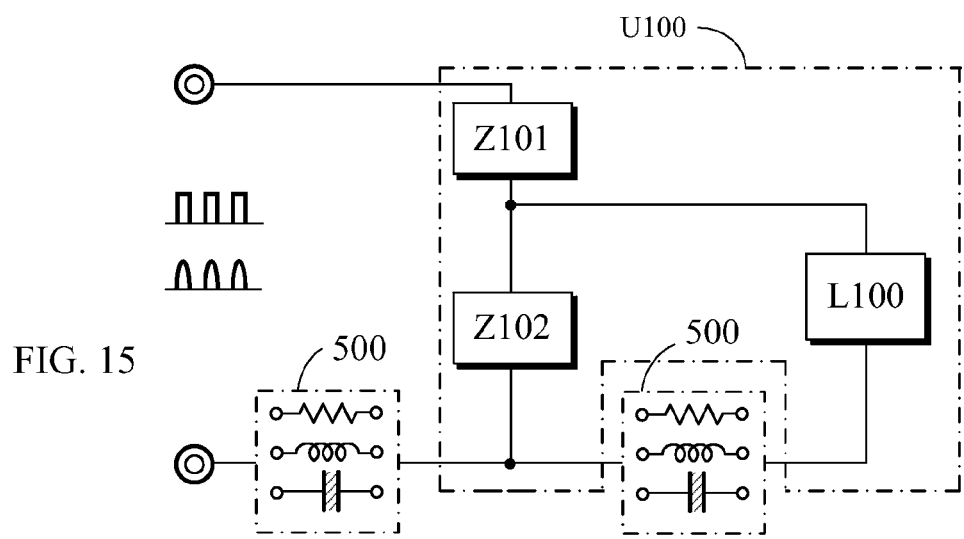
FIG. 15 is a circuit example schematic block diagram of the present invention which is series connected with impedance components.
Figure 16:
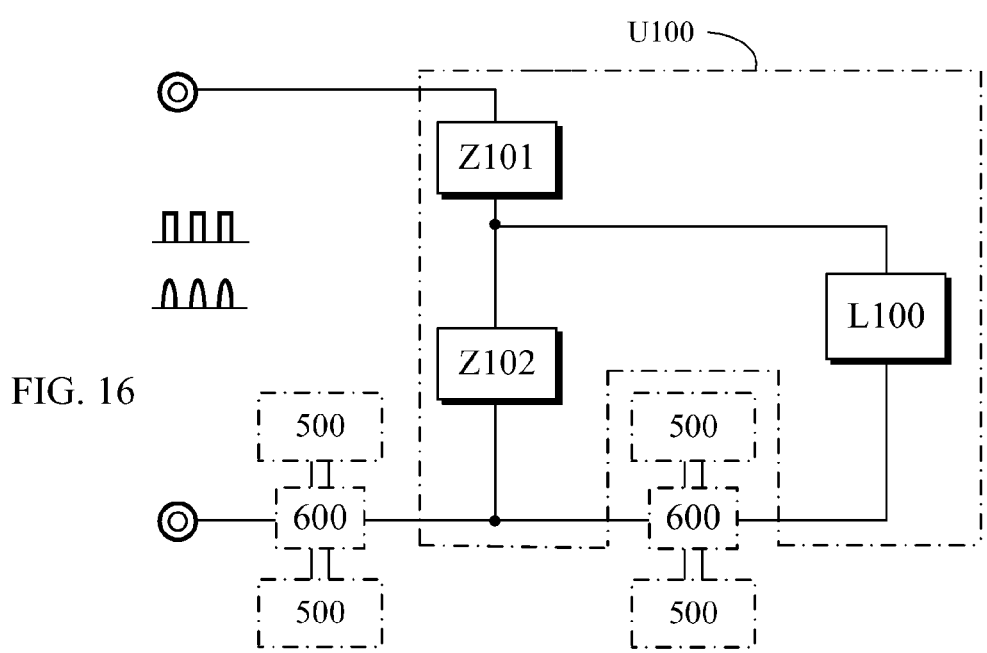
FIG. 16 is a circuit example schematic block diagram of the present invention illustrating that the impedance components in series connection execute series connection, or parallel connection, or series and parallel connection by means of the switching device.
Figure 17:
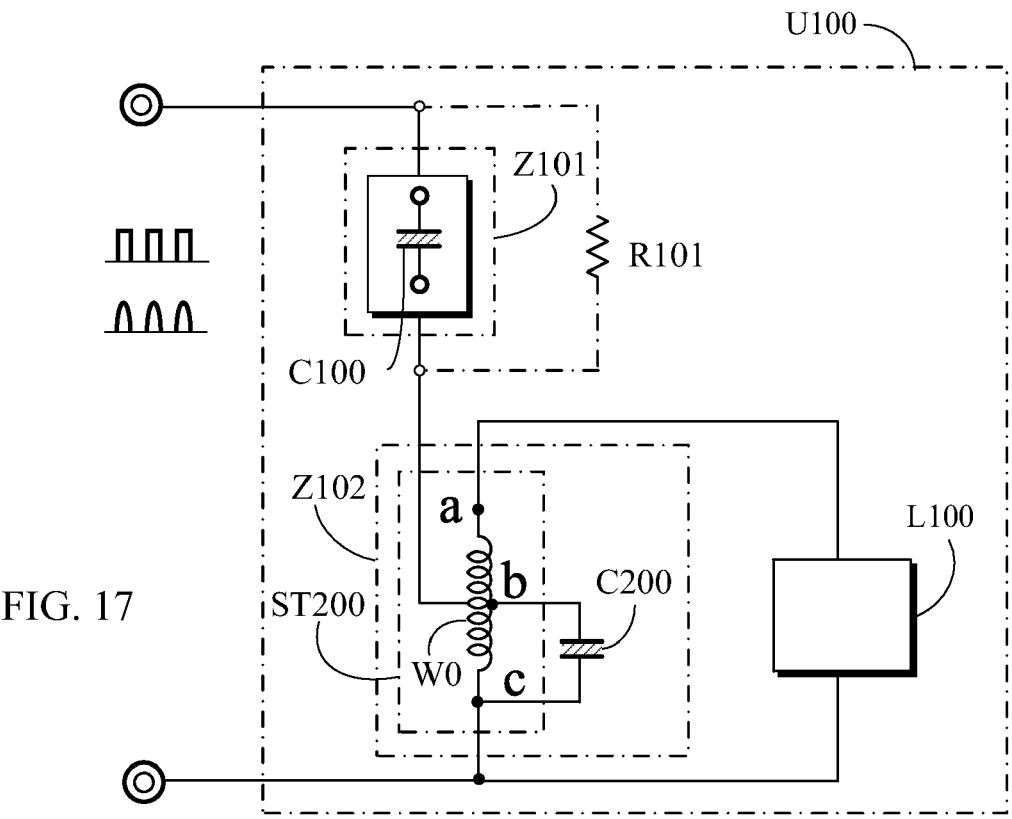
FIG. 17 is a circuit example schematic diagram of the present invention illustrating that the inductive impedance component of the second impedance is replaced by the self-coupled voltage change power supply side winding of the self-coupled transformer thereby to constitute a voltage rise.
Figure 18:
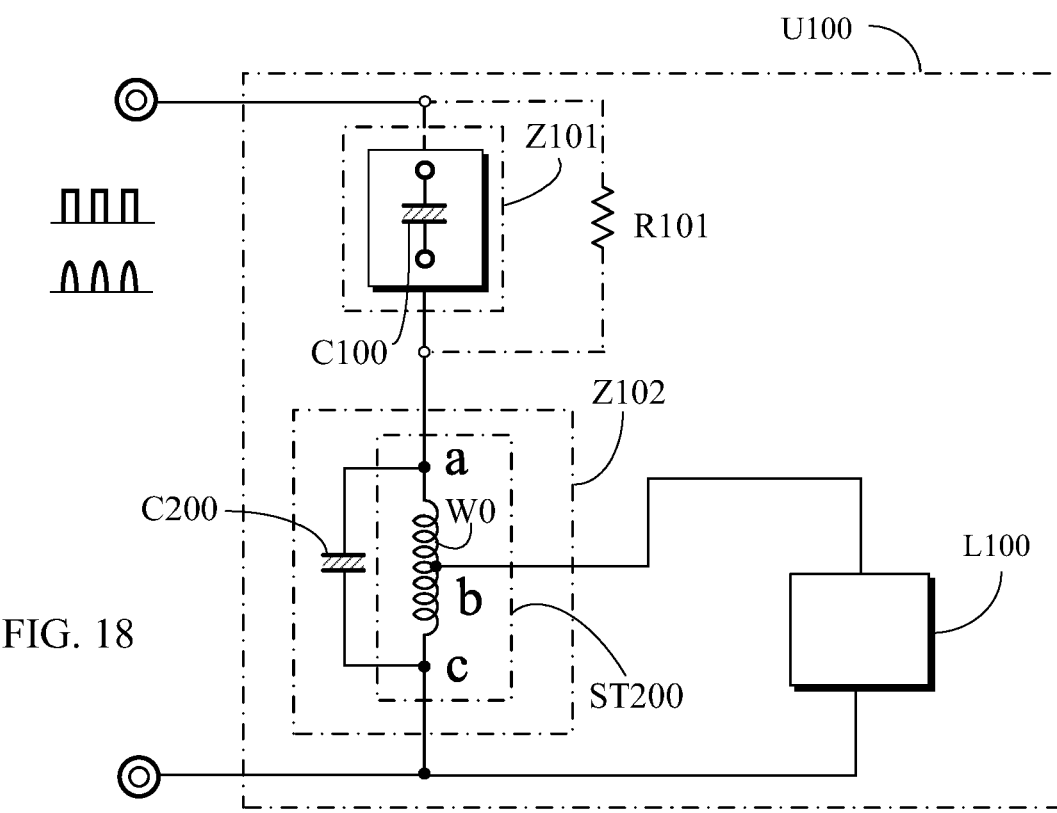
FIG. 18 is a circuit example schematic diagram of the present invention illustrating that the inductive impedance component of the second impedance is replaced by the self-coupled voltage change power supply side winding of the self-coupled transformer thereby to constitute a voltage drop.
Figure 19:
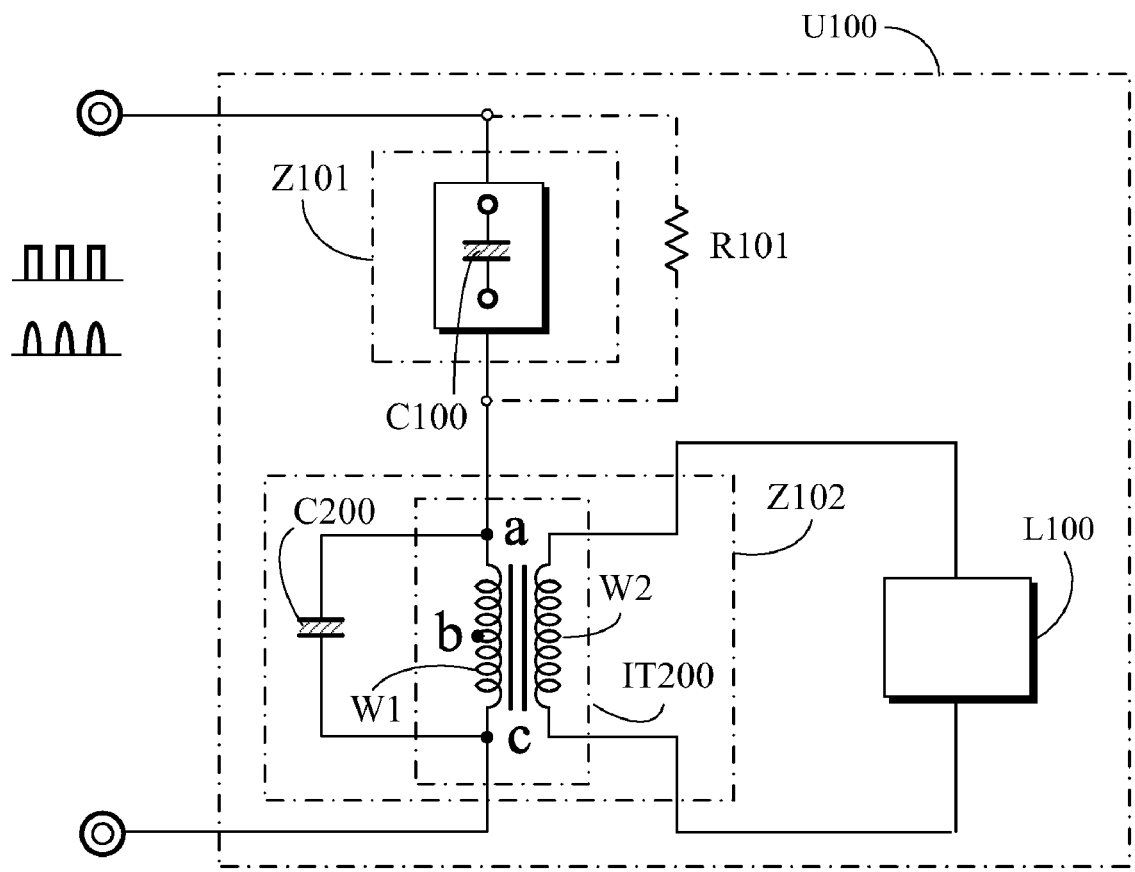
FIG. 19 is a circuit example schematic diagram of the present invention illustrating that the inductive impedance component of the second impedance is replaced by the primary side winding of the separating type transformer with separating type voltage change winding.

The first impedance (Z101), the second impedance (Z102), the bi-directional conducting light emitting diode set (L100), the first light emitting diode (LED101), the second light emitting diode (LED102) and the various aforesaid optional auxiliary circuit components shown in the circuit examples of FIGS. 1~11 are based on application needs, whereof they can be optionally installed or not installed as needed and the installation quantity include constitution by one, wherein if more than one component are selected in the application, the corresponding polarity relationship shall be determined based on circuit function requirement to do series connection, or parallel connection, or series and parallel connections; thereof it is constituted as the following:

1. The first impedance (Z101) can be constituted by one or by more than one in series connection or parallel connection or series and parallel connection, whereof in multiple installations, each first impedance can be constituted by the same kind of capacitors (C100), inductive impedance components, or resistive impedance components, or other different kinds of impedance components, in which their impedance values can be the same or different;

2. The second impedance (Z102) can be constituted by a capacitor (C200) and an inductive impedance component (I200) in parallel connection, whereof the second impedance (Z102) can be constituted by one or by more than one in series connection, or parallel connection, or series and parallel connection, whereof in case of multiple installations, each second impedance can be constituted by the same kinds of capacitive impedance components and inductive impedance components in parallel connection, and their impedance values can be the same or different. However, the inherent parallel resonance frequency of the capacitor (C200) and the inductive impedance component (I200) in parallel connection is not in parallel resonance with the pulse period of the pulsed power;

3. The first light emitting diode (LED101) can be constituted by one light emitting diode, or by more than one light emitting diodes in series connection of forward polarities, or in parallel connection of the same polarity, or in series and parallel connections;

4. The second light emitting diode (LED102) can be constituted by one light emitting diode, or by more than one light emitting diodes in series connection of forward polarities, or parallel connection of the same polarity, or in series and parallel connections;

5. In the bi-directional light emitting diode drive circuit (U100):

(1) It can be optionally installed with one or more than one set of bi-directional conducting light emitting diode sets (L100) in series connection, parallel connection or in series and parallel connection, whereof if one set or more than one sets are selected to be installed, they can be jointly driven by the divided power at a common second impedance (Z102) or driven individually by the divided power at the corresponding one of the multiple second impedances (Z102) which are in series connection or parallel connection;

(2) If the charge/discharge device (ESD101) or (ESD102) is installed in the bi-directional light emitting diode drive circuit (U100), the light emitting diodes (LED101) or (LED102) in the bi-directional conducting light emitting diode set (L100) is relied on the continuous DC power to emit light;

If the charge/discharge device (ESD101) or (ESD102) is not installed, current conduction to light emitting diode (LED101) or (LED102) is intermittent, whereby referring to the input voltage wave shape and duty cycle of current conduction, the light emitting forward current and the peak of light emitting forward voltage of each light emitting diode in the bi-directional conducting light emitting diode set (L100) can be correspondingly selected for the light emitting diode (LED101) or (LED102), whereof the selections include the following:

1) The light emitting peak of forward voltage is lower than the rated forward voltage of light emitting diode (LED101) or (LED102); or 2) The rated forward voltage of light emitting diode (LED101) or (LED102) is selected to be the light emitting peak of forward voltage; or 3) If current conduction to light emitting diode (LED101) or (LED102) is intermittent, the peak of light emitting forward voltage can be correspondingly selected based on the duty cycle of current conduction as long as the principle of that the peak of light emitting forward voltage does not damage the light emitting diode (LED101) or (LED102) is followed;

Based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101) or (LED102);

The luminosity or the stepped or step-less luminosity modulation of the forward current vs. relative luminosity can be controlled based on the aforesaid value and wave shape of forward current;

6. The diode (CR100), diode (CR101), diode (CR102), diode (CR201) and diode (CR202) can be constituted by one diode, or by more than one diodes in series connection of forward polarities, or in parallel connection of the same polarity, or in series and parallel connection, whereof the said devices can be optionally installed as needed;

7. The discharge resistor (R101), current limit resistor (R100), current limit resistor (R103), and current limit resistor (R104) can be constituted by one resistor, or by more than one resistors in series connection, or parallel connection, or series and parallel connection, whereof the said devices can be optionally installed as needed;

8. The inductive impedance component (I100) or the inductive impedance component (I103) and inductive impedance (I104) can be constituted by one impedance component, or by more than one impedance components in series connection or in parallel connection or in series and parallel connection, whereof the said devices can be optionally installed as needed;

9. The zener diode (ZD101) or zener diode (ZD102) can be constituted by one zener diode, or by more than one zener diodes in series connection of forward polarities, or in parallel connection of the same polarity, or in series and parallel connection, whereof the said devices can be optionally installed as needed;

10. The charge/discharge device (ESD101), (ESD102) can be constituted by one, or by more than ones in series connection of forward polarities, or in parallel connection of the same polarity, or in series and parallel connection, whereof the said devices can be optionally installed as needed;

In the application of the bi-directional light emitting diode drive circuit (U100) of the pulsed power non-resonance, the following DC power sources can be inputted, including:

(1) DC pulsed power; or (2) The DC pulsed power with constant or variable voltage and constant or variable periods converted from DC power source; or (3) The DC pulsed power with constant or variable voltage and constant or variable periods converted from DC power which is further rectified from AC power; or (4) The half-wave or full-wave DC pulsed power rectified from AC power with constant or variable voltage and constant or variable frequency;

The following active modulating circuit devices can be further optionally combined as needed, whereof various applied circuits are the following:

1. FIG. 12 is a circuit example schematic block diagram of the present invention which is series connected to the power modulator of series connection type, whereof the power modulator of series connection type is constituted by the following:

A DC power modulator of series connection type (330), which is constituted by conventional electromechanical components or solid state power components and related electronic circuit components to modulate the DC pulsed power output;

A bi-directional power modulator of series connection type (300), which is constituted by the conventional electromechanical components or solid state power components and related electronic circuit components to modulate the bi-directional power output;

The circuit function operations are the following:

(1) The DC power modulator of series connection type (330) can be optionally installed as needed to be series connected with the bi-directional light emitting diode drive circuit (U100), whereby to receive the DC pulsed power from the power source, whereof the DC pulsed power is modulated by the DC power modulator of series connection type (330) to execute power modulations such as pulse width modulation or current conduction phase angle control, or impedance modulation, etc. to drive the bi-directional light emitting diode drive circuit (U100); or (2) The bi-directional power modulator of series connection type (300) can be optionally installed as needed to be series connected between the second impedance (ZD102) and the bi-directional conducting light emitting diode set (L100), whereof the bi-directional divided pulsed power in decaying wave shape from the two ends of the second impedance (Z102) is modulated by the be-directional power modulator of series connection type (300) to execute power modulations such as pulse width modulation or current conduction phase angle control, or impedance modulation, etc. to drive the bi-directional conducting light emitting diode set (L100);

2. FIG. 13 is a circuit example schematic block diagram of the present invention which is parallel connected to the power modulator of parallel connection type, whereof the power modulator of the parallel connection type is constituted by the following:

A DC power modulator of parallel connection type (430) is constituted by conventional electromechanical components or solid state power components and related electronic circuit components to modulate the output power of DC pulsed power;

The bi-directional power modulator of parallel connection type (400) which is constituted by conventional electromechanical components or solid state power components and related electronic circuit components to modulate the output power of bi-directional power;

The circuit operating functions are the following:

(1) The DC power modulator of parallel connection type (430) can be optionally installed as needed, whereof its output end is parallel connected with the bi-directional light emitting diode drive circuit (U100), while its input end is arranged to receive the DC pulsed power from the power source, whereof the DC pulsed power is modulated by the DC power modulator of parallel connection type (430) to execute power modulations such as pulse width modulation or current conduction phase angle control, or impedance modulation, etc. to drive the bi-directional light emitting diode drive circuit (U100); or (2) The bi-directional power modulator of parallel connection type (400) can be optionally installed as needed, whereof its output end is parallel connected with the input end of the bi-directional conducting light emitting diode set (L100) while the input end of the bi-directional power modulator of parallel connection type (400) are parallel connected with the second impedance (Z102) and, whereby the bi-directional AC divided pulsed power in decaying wave shape across the two ends of the second impedance (Z102) is modulated by the bi-directional power modulator of parallel connection type (400) to execute power modulations such as pulse width modulation or current conduction phase angle control, or impedance modulation, etc. to drive the bi-directional conducting light emitting diode set (L100);

3. FIG. 14 is a circuit example schematic block diagram of the present invention driven by the power outputted from a DC to DC converter, whereof the DC to DC converter is mainly constituted by:

A DC to DC converter (5000) which is constituted by conventional electromechanical components or solid state power components and related electronic circuit components, whereof its input end receives DC power while its output end provides output DC pulsed power with constant or variable voltage and constant or variable periods as needed;

The circuit operating functions are the following:

A DC to DC converter (5000), in which its input ends receive DC power while its output ends provide DC pulsed power, wherein the bi-directional light emitting diode drive circuit (U100) is parallel connected with the output end of the DC to DC converter (5000), and the input end of the DC to DC converter receives the optionally selected DC power with constant or variable voltage, or the DC power rectified from AC power;

The output end of the DC to DC converter (5000) provides output pulsed power with constant or variable voltage and constant or variable periods to control and drive the bi-directional light emitting diode drive circuit (U100);

In addition, the output power of the DC to DC converter (5000) can be operated to control the bi-directional light emitting diode drive circuit (U100) in series resonance, or to modulate its power output to execute pulse width modulation or current conduction phase angle control, or impedance modulation, etc to control and drive the bi-directional light emitting diode drive circuit (U100);

4. The bi-directional light emitting diode drive circuit (U100) is arranged to be series connected with a conventional impedance component (500) and to be further parallel connected with the power source, whereof the impedance component (500) include:

(1) An impedance component (500): it is constituted by a component with resistive impedance characteristics; or (2) An impedance component (500): it is constituted by a component with inductive impedance characteristics; or (3) An impedance component (500): it is constituted by a component with capacitive impedance characteristics; or (4) An impedance component (500): it is constituted by a single impedance component with the combined impedance characteristics of at least two of the resistive impedance, or inductive impedance, or capacitive impedance simultaneously, thereby to provide DC or AC impedances; or (5) An impedance component (500): it is constituted by a single impedance component with the combined impedance characteristics of capacitive impedance and inductive impedance, whereof its combined parallel resonance frequency is the same as the frequency or period of bi-directional or unidirectional pulsed power, thereby to produce a parallel resonance status; or (6) An impedance component (500): it is constituted by capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or (7) An impedance component (500): it is constituted by the mutual series connection of a capacitive impedance component and an inductive impedance component, whereof its inherent series resonance frequency is the same as the frequency or period of bi-directional or unidirectional pulsed power, thereby to produce a series resonance status and the end voltage across two ends of the capacitive impedance component or the inductive impedance component appear in series resonance correspondingly;

Or the capacitive impedance and the inductive impedance is mutually parallel connected, whereby its inherent parallel resonance frequency is the same as the frequency or period of bi-directional or unidirectional pulsed power, thereby to produce a parallel resonance status and appear the corresponding end voltage;

FIG. 15 is a circuit example schematic block diagram of the present invention which is series connected with impedance components;

5. At least two impedance components (500) as said in the item 4 execute switches between series connection, parallel connection and series and parallel connection bye means of the switching device (600) which is constituted by electromechanical components or solid state components, whereby to modulate the power transmitted to the bi-directional light emitting diode drive circuit (U100), wherein FIG. 16 is a circuit example schematic block diagram of the present invention illustrating that the impedance components in series connection execute series connection, or parallel connection, or series and parallel connection by means of the switching device;

The bi-directional light emitting diode drive circuit in pulsed power non-resonance, in which the optionally installed inductive impedance component (I200) of the second impedance (Z102) can be further replaced by the power supply side winding of a transformer with inductive effect, whereof the transformer can be a self-coupled transformer (ST200) with self-coupled voltage change winding or a transformer (IT200) with separated voltage change winding;

FIG. 17 is a circuit example schematic diagram of the present invention illustrating that the inductive impedance component of the second impedance is replaced by the self-coupled voltage change power supply side winding of the self-coupled transformer thereby to constitute a voltage rise, whereof as shown in FIG. 17, the self-coupled transformer (ST200) has a self-coupled voltage change winding (W0) with voltage raising function, the b, c ends of the self-coupled voltage change winding (W0) of the self-coupled transformer (ST200) are the power supply side which replace the inductive impedance component (I200) of the second impedance (Z102) to be parallel connected with the capacitor (C200), thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, however, the inherent parallel resonance frequency of the self-coupled voltage change winding (W0) and the capacitor (C200) in parallel connection is not in parallel resonance with the pulse period of the pulsed power; whereof the a, c output taps of the self-coupled voltage change winding (W0) of the self-coupled transformer (ST200) are arranged to provide a bi-directional alternated power output of voltage rise to drive the bi-directional conducting light emitting diode set (L100);

FIG. 18 is a circuit example schematic diagram of the present invention illustrating that the inductive impedance component of the second impedance is replaced by the self-coupled voltage change power supply side winding of the self-coupled transformer thereby to constitute a voltage rise, whereof as shown in FIG. 17, the self-coupled transformer (ST200) has a self-coupled voltage change winding (W0) with voltage raising function, and the b, c ends of the self-coupled voltage change winding (W0) of the self-coupled transformer (ST200) are the power supply side which replace the inductive impedance component (I200) of the second impedance (Z102) to be parallel connected with the capacitor (C200), thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, however, the inherent parallel resonance frequency of the self-coupled voltage change winding (W0) and the capacitor (C200) in parallel connection is not in parallel resonance with the pulse period of the pulsed power; whereof the b, c output taps of the self-coupled voltage change winding (W0) of the self-coupled transformer (ST200) are arranged to provide a bi-directional alternated power output of voltage rise to drive the bi-directional conducting light emitting diode set (L100);

FIG. 19 is a circuit example schematic diagram of the present invention illustrating that the inductive impedance component of the second impedance is replaced by the primary side winding of the separating type transformer with separating type voltage change winding, whereof as shown in FIG. 19, the separating type transformer (IT200) is comprised of a primary side winding (W1) and a secondary side winding (W2), in which the primary side winding (W1) and the secondary side winding (W2) are separated, whereof the primary side winding (W1) is parallel connected with the capacitor (C200), thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, however, the inherent parallel resonance frequency of the primary side winding (W1) and the capacitor (C200) in parallel connection is not in parallel resonance with the pulse period of the pulsed power, whereof the output voltage of the secondary side winding (W2) of the separating type transformer (IT200) can be optionally selected to be voltage rise or voltage drop, whereof the bi-directional conducting light emitting diode set (L100) is driven by the bi-directional alternated power output of the secondary side winding.

Through the above description, the inductive impedance component (I200) of the second impedance (Z102) is replaced by the power supply side winding of the transformer and is parallel connected with the capacitor (C200), thereby to constitute the second impedance while the secondary side of the separating type transformer (IT200) provides AC power of voltage rise or voltage drop to drive the bi-directional conducting light emitting diode set (L100).

Color of the individual light emitting diodes (LED101) and (LED102) of the bi-directional conducting light emitting diode set (L100) in the bi-directional light emitting diode drive circuit (U100) of the bi-directional light emitting diode drive circuit in pulsed power non-resonance can be optionally selected to be constituted by one or more than one colors.

The relationships of location arrangement between the individual light emitting diodes (LED101) of the bi-directional conducting light emitting diode set (L100) in the bi-directional light emitting diode drive circuit (U100) of the bi-directional light emitting diode drive circuit in pulsed power non-resonance include the following: 1) sequentially linear arrangement; 2) sequentially distributed in a plane; 3) crisscross-linear arrangement; 4) crisscross distribution in a plane; 5) arrangement based on particular geometric positions in a plane; 6) arrangement based on 3D geometric positions.

The bi-directional light emitting diode drive circuit in pulsed power non-resonance, in which the embodiments of its bi-directional light emitting diode drive circuit (U100) are constituted by circuit components which include: 1) It is constituted by individual circuit components which are inter-connected; 2) At least two circuit components are combined to at least two partial functioning units which are further inter-connected; 3) All components are integrated together to one structure.

As is summarized from above descriptions, progressive performances of power saving, low heat loss and low cost can be provided by the bi-directional light emitting diode drive circuit in pulsed power non-resonance through charging/discharging the uni-polar capacitor to drive the light emitting diode.

The invention claimed is:

1. A bi-directional light emitting diode drive circuit in pulsed power non-resonance, the circuit of the bi-directional light emitting diode drive circuit (U100) includes at least one capacitive impedance component or inductive impedance component, or resistive impedance component to be a first impedance, and at least one capacitive impedance component and at least one inductive impedance component in parallel connection, wherein the inherent parallel resonance frequency of the two after parallel connection is different from the pulse period of the pulsed power, and no parallel resonance is produced, thereby to be a second impedance; further, at least one first light emitting diode and at least one second light emitting diode are in parallel connection of inverse polarities, whereby to be at least one bi-directional conducting light emitting diode set which is parallel connected across the two ends of the second impedance, while the two ends of the first impedance and the second impedance are provided with the pulsed power input;

a bi-directional divided alternated power is formed across the two ends of the first impedance and across the two ends of the second impedance, wherein at least one bi-directional conducting light emitting diode set is driven by the bi-directional divided power in decaying wave shape formed at the second impedance, or at least two bi-directional conducting light emitting diode sets respectively parallel connected across the two ends of the first impedance and across the two ends of second impedance are respectively driven by the divided power across the two ends of the first impedance and across the two ends of the second impedance, thereby to be the bi-directional light emitting diode drive circuit in pulsed power non-resonance of the present invention; comprising:

the first impedance Z01 includes one or more than one capacitors (C100) (or inductive impedance component, or resistive impedance component); or two or more than two kinds of impedance components, wherein each kind of impedance component can be one or more than one in series connection, or parallel connection, or series and parallel connection;

the second impedance (Z102) includes at least one inductive impedance component (I200) and at least one capacitor (C200) in parallel connection, wherein their inherent parallel resonance frequency is different from the pulse period of the pulsed power, thereby no parallel resonance is produced;

the first impedance (Z101) and the second impedance (Z102) are mutually series connected, wherein the two ends of the series connected first impedance (Z101) and second impedance (Z102) are for inputting:

1) DC pulsed power; or
2) the DC pulsed power with constant or variable voltage and constant or variable periods converted from DC power source; or
3) the DC pulsed power with constant or variable voltage and constant or variable periods converted from DC power which is further rectified from AC power; or
4) half-wave or full-wave DC pulsed power rectified from AC power with constant or variable voltage and constant or variable frequency;

a bi-directional conducting light emitting diode set (L100) including at least one first light emitting diode (LED101) and at least one second light emitting diode (LED102) in parallel connection of inverse polarities, wherein the numbers of the first light emitting diode (LED101) and the numbers of the second light emitting diode (LED102) can be the same or different, further, the first light emitting diode (LED101) and the second light emitting diode (LED102) can be one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed, wherein it is parallel connected across the two ends of both or either of the first impedance (Z101) or the second impedance (Z102) to form divided power at two ends of both the first impedance (Z101) and the second impedance (Z102) by the power input, thereby to drive the bi-directional conducting light emitting diode set (L100) to emit light which is parallel connected across the two ends of the first impedance (Z101) and the second impedance (Z102);

the first impedance (Z101) and the second impedance (Z102) as well as the bi-directional conducting light emitting diode set (L100) in the bi-directional light emitting diode drive circuit (U100) can be optionally selected as needed to be one or more than one;

the bi-directional divided alternated power are formed across the two ends of the first impedance and the second impedance in the above circuit, wherein at least one bi-directional conducting light emitting diode set is driven by the divided power in decaying wave shape formed at the second impedance, or at least two bi-directional conducting light emitting diode sets which are respectively parallel connected across the two ends of the first impedance and the second impedance are respectively driven by the divided powers across the two ends of the first impedance and the second impedance, thereby to constitute the bi-directional light emitting diode drive circuit in pulsed power non-resonance;

the first impedance (Z101), the second impedance (Z102), the bi-directional conducting light emitting diode set (L100), the first light emitting diode (LED101), the second light emitting diode (LED102) and various optional auxiliary circuit components are based on application needs, wherein they can be optionally installed or not installed as needed and the installation quantity include constitution by one, wherein if more than one component are selected in the application, the corresponding polarity relationship shall be determined based on circuit function requirement to do series connection, or parallel connection, or series and parallel connections.

2. A bi-directional light emitting diode drive circuit in pulsed power non-resonance as claimed in claim 1, comprised of:

the first impedance (Z101) including at least one capacitor (C100) with especially referring to a bipolar capacitor, wherein the quantity of the first impedance can be one or more than ones;

the second impedance (Z102) including at least one inductive impedance component (I200) and at least one capacitor (C200) in parallel connection, wherein its inherent parallel resonance frequency after parallel connection is different from the pulse period of the pulsed power, thereby no parallel resonance is produced, wherein the quantity of the second impedance can be one or more than ones;

at least one first impedance (Z101) and at least one second impedance (Z102) are in series connection, wherein the two ends after series connection are provided with a pulsed power, thereby a bi-directional divided alternated power is formed at the second impedance (Z102) to drive at least one bi-directional conducting light emitting diode set (L100);

the bi-directional conducting light emitting diode set (L100) including at least one first light emitting diode (LED101) and at least one second light emitting diode (LED102) in parallel connection of inverse polarities, wherein the numbers of the first light emitting diode (LED101) and the second light emitting diode (LED102) can be the same or different, further, the first light emitting diode (LED101) and the second light emitting diode (LED102) can be one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed, wherein it is parallel connected across the two ends of both or either of the first impedance (Z101) or the second impedance (Z102) to form divided power, thereby to drive the bi-directional conducting light emitting diode set (L100) which is parallel connected across the two ends of the first impedance (Z101) or the second impedance (Z102) to emit light; or at least one bi-directional conducting light emitting diode set (L100) is parallel connected to the two ends of at least one second impedance (Z102), thereby to be driven by the divided power across the two ends of the second impedance (Z102) while the first impedance (Z101) is used to limit its current, wherein in case that the capacitor (C100) (such as a bipolar capacitor) is used as the first impedance component, the output current is limited by the capacitive impedance of the capacitor (C100);

the first impedance (Z101), the second impedance (Z102) and the bi-directional conducting light emitting diode set (L100) are connected according to the aforesaid circuit structure to constitute the bi-directional light emitting diode drive circuit (U100).

3. A bi-directional light emitting diode drive circuit in pulsed power non-resonance as claimed in claim 1, wherein through the current distribution effect formed by the parallel connection of the bi-directional conducting light emitting diode set (L100) and the second impedance (Z102), the voltage variation rate across the two ends of the bi-directional conducting light emitting diode set (L100) corresponding to power source voltage variation can be reduced.

4. A bi-directional light emitting diode drive circuit in pulsed power non-resonance as claimed in claim 1, wherein the first impedance (Z101) can also be selected not to be installed, while the second impedance (Z102) is directly parallel connected with the pulsed power source to operate in the non-parallel resonance status but appear bi-directional divided alternated power in decaying wave shape.

5. A bi-directional light emitting diode drive circuit in pulsed power non-resonance as claimed in claim 2, wherein the first impedance (Z101) can also be selected not to be installed, while the second impedance (Z102) is directly parallel connected with the pulsed power source to operate in the non-parallel resonance status but appear bi-directional divided alternated power in decaying wave shape.

6. A bi-directional light emitting diode drive circuit in pulsed power non-resonance as claimed in claim 2, wherein one of the first light emitting diode (LED101) or the second light emitting diode (LED102) can be replaced by a diode (CR100) while the current direction of the diode (CR100) and the working current direction of the reserved first light emitting diode (LED101) or the second light emitting diode (LED102) are in parallel connection of inverse polarities.

7. A bi-directional light emitting diode drive circuit in pulsed power non-resonance as claimed in claim 1, wherein if the first light emitting diode (LED101) and the second light emitting diode (LED102) which constitute the bi-directional conducting light emitting diode set (L100) are both disposed with the current limit resistors (R103) and (R104), a current limit resistor (R100) can be directly series connected to the bi-directional conducting light emitting diode set (L100) to replace or installed together with the current limit resistors (R103) and (R104) to obtain current limit function, wherein the current limit resistor (R100) can be replaced by an inductive impedance component (1100); whereby the bi-directional light emitting diode drive circuit (U100) is the said circuit structure and selection of auxiliary circuit components.

8. A bi-directional light emitting diode drive circuit in pulsed power non-resonance as claimed in claim 1, wherein a zener diode can further be respectively parallel connected across the two ends of the first light emitting diode (LED101) and the second light emitting diode (LED102) of the bi-directional conducting light emitting diode set (L100), or the zener diode can be first series connected with at least one diode to produce the function of zener voltage effect, then to be parallel connected across the two ends of the first light emitting diode (LED101) or the second light emitting diode (LED102); wherein the constitution includes that the two ends of the first light emitting diode (LED101) which constitutes the bi-directional conducting light emitting diode set (L100) in the bi-directional light emitting diode drive circuit (U100) are parallel connected with a zener diode (ZD101), wherein the polarity relationship is that the zener voltage of the zener diode (ZD101) is used to limit the working voltage across the two ends of the first light emitting diode (LED101);
- aforesaid zener diode (ZD101) can be optionally series connected with a diode (CR201) as needed to commonly produce a zener voltage effect function, whereby the advantages are 1) the zener diode (ZD101) can be protected from reverse current; 2) both diode (CR201) and zener diode (ZD101) have temperature compensation effect;
- if the second light emitting diode (LED102) is selected in the bi-directional conducting light emitting diode set (L100), a zener diode can be optionally series connected with the two ends of the said second light emitting diode (LED102), wherein their polarity relationship is that the zener voltage of the zener diode (ZD102) is used to limit the working voltage across the two ends of the second light emitting diode (LED102).

9. A bi-directional light emitting diode drive circuit in pulsed power non-resonance as claimed in claim 1, wherein the zener diode (ZD102) can be optionally series connected with a diode (CR202) as needed, whereby the advantages are 1) the zener diode (ZD102) can be protected from reverse current; 2) both diode (CR202) and zener diode (ZD102) have temperature compensation effect.

10. A bi-directional light emitting diode drive circuit in pulsed power non-resonance as claimed in claim 1, wherein the zener diode includes:
1) a zener diode (ZD101) is parallel connected across the two ends of the first light emitting diode (LED101) of the bi-directional conducting light emitting diode set (L100), and a zener diode (ZD102) is parallel connected across the two ends of the second light emitting diode (LED102); or
2) the two zener diodes (ZD101) and (ZD102) are series connected in opposite directions and further parallel connected across the two ends of the bi-directional conducting light emitting diode set (L100); or
3) it is replaced by the diode of bi-directional zener effect which is parallel connected across the two ends of the bi-directional conducting light emitting diode set (L100); all of the aforesaid three circuits can avoid over high end voltage to the first light emitting diode (LED101) and the second light emitting diode (LED102).

11. A bi-directional light emitting diode drive circuit in pulsed power non-resonance as claimed in claim 1, wherein the first light emitting diode (LED101) can be installed with a charge/discharge device (ESD101), or the second light emitting diode (LED102) can be installed with a charge/discharge device (ESD102), wherein the charge/discharge device (ESD101) and the charge/discharge device (ESD102) have the random charging or discharging characteristics which can stabilize the lighting stability of the first light emitting diode (LED101) and the second light emitting diode (LED102), whereby to reduce their lighting pulsations the aforesaid charge/discharge devices (ESD101), (ESD102) can include the conventional charging and discharging batteries, or super-capacitors or capacitors.

12. A bi-directional light emitting diode drive circuit in pulsed power non-resonance as claimed in claim 1, wherein the application circuits with additional installed charge/discharge device includes a charge/discharge device (ESD101) to be parallel connected across the two ends of the current limit resistor (R103) and the first light emitting diode (LED101) in series connection.

13. A bi-directional light emitting diode drive circuit in pulsed power non-resonance as claimed in claim 1, wherein a further application circuit with a charge/discharge device being parallel connected across the two ends of the first and second light emitting diodes and the current limit resistor in series connection, wherein its constitution includes:
- a charge/discharge device (ESD101) based on its polarity is parallel connected across the two ends of the first light emitting diode (LED101) and the current limit resistor (R103) in series connection, or is directly parallel connected across the two ends of the first light emitting diode (LED101), wherein the charge/discharge device (ESD101) has the random charge/discharge characteristics to stabilize the lighting operation and to reduce the lighting pulsation of the first light emitting diode (LED101);
- if the second light emitting diode (LED102) is selected to use, a charge/discharge device (ESD102) based on its polarity is parallel connected across the two ends of the second light emitting diode (LED102) and the current limit resistor (R104) in series connection, or is directly parallel connected across the two ends of the second light emitting diode (LED102), wherein the charge/discharge device (ESD102) has the random charge/discharge characteristics to stabilize the lighting operation and to reduce the lighting pulsation of the second light emitting diode (LED102);
- if a first light emitting diode (LED101) is selected and is reversely parallel connected with a diode (CR100) in the bi-directional light emitting diode drive circuit (U100), then its main circuit structure is that a charge/discharge device (ESD101) based on its polarity is parallel connected across the two ends of the first light emitting diode (LED101) and the current limit resistor (R103) in series connection, wherein the charge/discharge device (ESD101) has the random charge/discharge characteristics to stabilize the lighting operation and to reduce the lighting pulsation of the first light emitting diode (LED101);
- aforesaid charge/discharge devices (ESD101), (ESD102) can include the conventional charging and discharging batteries, or super-capacitors or capacitors.

14. A bi-directional light emitting diode drive circuit in pulsed power non-resonance as claimed in claim 8, wherein when the current limit resistor (R100) is selected to replace the current limit resistors (R103), (R104) for the common current limit resistor of the bi-directional conducting light emitting diode set (L100), or the current limit resistors (R103), (R104) and (R100) are not installed, the main circuit structure includes:

a charge/discharge device (ESD101) is directly parallel connected across the two ends of the first light emitting diode (LED101) at the same polarity, and a charge/discharge device (ESD102) is directly parallel connected across the two ends of the second light emitting diode (LED102) at the same polarity, wherein the charge/discharge devices (ESD101) and (ESD102) has the random charge or discharge characteristics.

15. A bi-directional light emitting diode drive circuit in pulsed power non-resonance as claimed in claim 1, wherein a charge/discharge device can be further installed across the two ends of the bi-directional conducting light emitting diode set (L100) for random charging/discharging, thereby besides of stabilizing the lighting stabilities of the first light emitting diode (LED101) and the second light emitting diode (LED102) of the bi-directional conducting light emitting diode set (L100), the charge/discharge device can provide its saved power during a power off to drive at least one of the first light emitting diode (LED101) or the second light emitting diode (LED102) to continue emitting light;

if the charge/discharge devices (ESD101) or (ESD102) used is uni-polar, then after the first light emitting diode (LED101) is parallel connected with the uni-polar charge/discharge device (ESD101), a diode (CR101) of forward polarity can be optionally installed as needed to prevent reverse voltage from damaging the uni-polar charge/discharge device; wherein after the second light emitting diode (LED102) is parallel connected with the uni-polar charge/discharge device (ESD102), a diode (CR102) of forward polarity can be optionally installed as needed to prevent reverse voltage from damaging the uni-polar charge/discharge device;

aforesaid charge/discharge devices (ESD101), (ESD102) can include the conventional charging and discharging batteries, or super-capacitors or capacitors.

16. A bi-directional light emitting diode drive circuit in pulsed power non-resonance as claimed in claim 1, wherein the bi-directional conducting light emitting function of the diode in the bi-directional conducting light emitting diode set (L100) is constituted includes that a diode (CR101) is parallel connected with at least one first light emitting diode (LED101) in inverse polarities, and a diode (CR102) is parallel connected with at least one second light emitting diode (LED102) in inverse polarities, wherein the two are further series connected in opposite directions to constitute a bi-directional conducting light emitting diode set.

17. A bi-directional light emitting diode drive circuit in pulsed power non-resonance as claimed in claim 1, wherein in the bi-directional light emitting diode drive circuit (U100), it can be optionally installed with one or more than one set of bi-directional conducting light emitting diode sets (L100) in series connection, parallel connection or in series and parallel connection, wherein if one set or more than one sets are selected to be installed, they can be jointly driven by the divided power at a common second impedance (Z102) or driven individually by the divided power at the corresponding one of the multiple second impedances (Z102) which are in series connection or parallel connection.

18. A bi-directional light emitting diode drive circuit in pulsed power non-resonance as claimed in claim 1, wherein if the charge/discharge device is not installed, current conduction to light emitting diode is intermittent, whereby referring to the input voltage wave shape and duty cycle of current conduction, the light emitting forward current and the peak of light emitting forward voltage of each light emitting diode in the bi-directional conducting light emitting diode set (L100) can be correspondingly selected for the light emitting diode;

if current conduction to light emitting diode is intermittent, the peak of light emitting forward voltage can be correspondingly selected based on the duty cycle of current conduction as long as the principle of that the peak of light emitting forward voltage does not damage the light emitting diode is followed.

19. A bi-directional light emitting diode drive circuit in pulsed power non-resonance as claimed in claim 1, wherein if the charge/discharge device (ESD101) or (ESD102) is not installed, based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101) or (LED102).

20. A bi-directional light emitting diode drive circuit in pulsed power non-resonance as claimed in claim 1, wherein it is series connected to the power modulator of series connection type, wherein the power modulator of series connection type includes the following:

a DC power modulator of series connection type (330), which includes conventional electromechanical components or solid state power components and related electronic circuit components to modulate the DC pulsed power output;

a bi-directional power modulator of series connection type (300), which includes the conventional electromechanical components or solid state power components and related electronic circuit components to modulate the bi-directional power output;

the circuit function operations are the following:
1) the DC power modulator of series connection type (330) is series connected with the bi-directional light emitting diode drive circuit (U100), whereby to receive the DC pulsed power from the power source, wherein the DC pulsed power is modulated by the DC power modulator of series connection type (330) to execute power modulations such as pulse width modulation or current conduction phase angle control, or impedance modulation to drive the bi-directional light emitting diode drive circuit (U100); or
2) the bi-directional power modulator of series connection type (300) is series connected between the second impedance (ZD102) and the bi-directional conducting light emitting diode set (L100), wherein the bi-directional divided pulsed power in decaying wave shape from the two ends of the second impedance (Z102) is modulated by the be-directional power modulator of series connection type (300) to execute power modulations such as pulse width modulation or current conduction phase angle control, or impedance modulation to drive the bi-directional conducting light emitting diode set (L100).

21. A bi-directional light emitting diode drive circuit in pulsed power non-resonance as claimed in claim 1, wherein it is parallel connected to the power modulator of parallel connection type, wherein the power modulator of the parallel connection type includes the following:

a DC power modulator of parallel connection type (430) includes conventional electromechanical components or solid state power components and related electronic circuit components to modulate the output power of DC pulsed power;

the bi-directional power modulator of parallel connection type (400) which includes conventional electromechanical components or solid state power components and related electronic circuit components to modulate the output power of bi-directional power;

the circuit operating functions are the following:

1) the DC power modulator of parallel connection type (430) is installed, wherein its output end is parallel connected with the bi-directional light emitting diode drive circuit (U100), while its input end is arranged to receive the DC pulsed power from the power source, wherein the DC pulsed power is modulated by the DC power modulator of parallel connection type (430) to execute power modulations such as pulse width modulation or current conduction phase angle control, or impedance modulation to drive the bi-directional light emitting diode drive circuit (U100); or 2) the bi-directional power modulator of parallel connection type (400) is installed, wherein its output end is parallel connected with the input end of the bi-directional conducting light emitting diode set (L100) while the input end of the bi-directional power modulator of parallel connection type (400) are parallel connected with the second impedance (Z102) and, whereby the bi-directional AC divided pulsed power in decaying wave shape across the two ends of the second impedance (Z102) is modulated by the bi-directional power modulator of parallel connection type (400) to execute power modulations such as pulse width modulation or current conduction phase angle control, or impedance modulation to drive the bi-directional conducting light emitting diode set (L100).

22. A bi-directional light emitting diode drive circuit in pulsed power non-resonance as claimed in claim 1, wherein it is driven by the power outputted from a DC to DC converter, wherein the DC to DC converter comprises:

a DC to DC converter (5000) which includes conventional electromechanical components or solid state power components and related electronic circuit components, wherein its input end receives DC power while its output end provides output DC pulsed power with constant or variable voltage and constant or variable periods as needed;

the circuit operating functions are the following:

a DC to DC converter (5000), in which its input ends receive DC power while its output ends provide DC pulsed power, wherein the bi-directional light emitting diode drive circuit (U100) is parallel connected with the output end of the DC to DC converter (5000), and the input end of the DC to DC converter receives the optionally selected DC power with constant or variable voltage, or the DC power rectified from AC power;

the output end of the DC to DC converter (5000) provides output pulsed power with constant or variable voltage and constant or variable periods to control and drive the bi-directional light emitting diode drive circuit (U100);

in addition, the output power of the DC to DC converter (5000) can be operated to control the bi-directional light emitting diode drive circuit (U100) in series resonance, or to modulate its power output to execute pulse width modulation or current conduction phase angle control, or impedance modulation, etc to control and drive the bi-directional light emitting diode drive circuit (U100).

23. A bi-directional light emitting diode drive circuit in pulsed power non-resonance as claimed in claim 1, wherein the bi-directional light emitting diode drive circuit (U100) is arranged to be series connected with a conventional impedance component (500) and to be further parallel connected with the power source, wherein the impedance component (500) include includes:

1) a component with resistive impedance characteristics; or
2) a component with inductive impedance characteristics; or
3) a component with capacitive impedance characteristics; or
4) a single impedance component with the combined impedance characteristics of at least two of the resistive impedance, or inductive impedance, or capacitive impedance simultaneously, thereby to provide DC or AC impedances; or
5) a single impedance component with the combined impedance characteristics of capacitive impedance and inductive impedance, wherein its combined parallel resonance frequency is the same as the frequency or period of bi-directional or uni-directional pulsed power, thereby to produce a parallel resonance status; or
6) capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or
7) the mutual series connection of a capacitive impedance component and an inductive impedance component, wherein its inherent series resonance frequency is the same as the frequency or period of bi-directional or uni-directional pulsed power, thereby to produce a series resonance status and the end voltage across two ends of the capacitive impedance component or the inductive impedance component appear in series resonance correspondingly;

or the capacitive impedance and the inductive impedance is mutually parallel connected, whereby its inherent parallel resonance frequency is the same as the frequency or period of bi-directional or uni-directional pulsed power, thereby to produce a parallel resonance status and appear the corresponding end voltage.

24. A bi-directional light emitting diode drive circuit in pulsed power non-resonance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage raising function, the b, c ends of the self-coupled voltage change winding (W0) of the self-coupled transformer (ST200) are the power supply side which replace the inductive impedance component (I200) of the second impedance (Z102) to be parallel connected with the capacitor (C200), thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, however, the inherent parallel resonance frequency of the self-coupled voltage change winding (W0) and the capacitor (C200) in parallel connection is not in parallel resonance with the pulse period of the pulsed power; wherein the a, c output taps of the self-coupled voltage change winding (W0) of the self-coupled transformer (ST200) are arranged to provide a bi-directional alternated power output of voltage rise to drive the bi-directional conducting light emitting diode set (L100).

25. A bi-directional light emitting diode drive circuit in pulsed power non-resonance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage raising function, and the b, c ends of the self-coupled voltage change winding (W0) of the self-coupled transformer (ST200) are the power supply side which replace the inductive impedance component (I200) of the second impedance (Z102) to be parallel connected with the capacitor (C200), thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, however, the inherent parallel resonance frequency of the self-coupled voltage change winding (W0) and the capacitor (C200) in parallel connection is not in parallel resonance with the pulse period of the pulsed power; wherein the b, c output taps of the self-coupled voltage change winding (W0) of the self-coupled transformer (ST200) are arranged to provide a bi-directional alternated power output of voltage rise to drive the bi-directional conducting light emitting diode set (L100).

26. A bi-directional light emitting diode drive circuit in pulsed power non-resonance as claimed in claim 1, wherein the optionally installed inductive impedance component (I200) of the second impedance (Z102) can be further replaced by the power supply side winding of a transformer with inductive effect, wherein the separating type transformer (IT200) is comprised of a primary side winding (W1) and a secondary side winding (W2), in which the primary side winding (W1) and the secondary side winding (W2) are separated, wherein the primary side winding (W1) is parallel connected with the capacitor (C200), thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, however, the inherent parallel resonance frequency of the primary side winding (W1) and the capacitor (C200) in parallel connection is not in parallel resonance with the pulse period of the pulsed power, wherein the output voltage of the secondary side winding (W2) of the separating type transformer (IT200) can be optionally selected to be voltage rise or voltage drop, wherein the bi-directional conducting light emitting diode set (L100) is driven by the bi-directional alternated power output of the secondary side winding;

based on the above description, the inductive impedance component (I200) of the second impedance (Z102) is replaced by the power supply side winding of the transformer and is parallel connected with the capacitor (C200), thereby to constitute the second impedance while the secondary side of the separating type transformer (IT200) provides AC power of voltage rise or voltage drop to drive the bi-directional conducting light emitting diode set (L100).

\* \* \* \* \*